(12) United States Patent
Kamekawa

(10) Patent No.: US 10,306,085 B2
(45) Date of Patent: May 28, 2019

(54) INFORMATION PROCESSING APPARATUS, CONTROL METHOD OF INFORMATION PROCESSING APPARATUS, AND RECORDING MEDIUM

(71) Applicant: CANON KABUSHIKI KAISHA, Tokyo (JP)

(72) Inventor: Mikihiko Kamekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/878,469

(22) Filed: Jan. 24, 2018

(65) Prior Publication Data

US 2018/0234562 A1 Aug. 16, 2018

(30) Foreign Application Priority Data

Feb. 10, 2017 (JP) .................. 2017-023482

(51) Int. Cl.
*G06F 15/00* (2006.01)
*H04N 1/00* (2006.01)
*H04N 1/32* (2006.01)

(52) U.S. Cl.
CPC ..... *H04N 1/00477* (2013.01); *H04N 1/00013* (2013.01); *H04N 1/00334* (2013.01); *H04N 1/32614* (2013.01); *H04N 1/32641* (2013.01); *H04N 1/32651* (2013.01); *H04N 2201/0081* (2013.01); *H04N 2201/0094* (2013.01)

(58) Field of Classification Search
CPC ....... H04N 1/32614; H04N 2201/0094; H04N 1/32651
USPC ........................................ 358/1.15
See application file for complete search history.

(56) References Cited

U.S. PATENT DOCUMENTS

| 8,531,694 | B2 | 9/2013 | Kamekawa | |
|---|---|---|---|---|
| 2001/0028808 | A1* | 10/2001 | Nomura | H04N 1/00352 399/81 |
| 2007/0201068 | A1* | 8/2007 | Matsuki | G06F 3/1208 358/1.13 |
| 2014/0368866 | A1* | 12/2014 | Kikumoto | G06K 15/005 358/1.15 |

FOREIGN PATENT DOCUMENTS

| JP | 2013001059 A | 1/2013 |
|---|---|---|
| JP | 2013145585 A | 7/2013 |

* cited by examiner

*Primary Examiner* — Saeid Ebrahimi Dehkordy
(74) *Attorney, Agent, or Firm* — Venable LLP

(57) ABSTRACT

An area indicating a progress status of processing for all of the plurality of documents is divided into individual areas indicating a progress status of processing for each of the plurality of documents, and a progress status of processing for each corresponding document is displayed in the individual areas obtained by the division.

19 Claims, 18 Drawing Sheets

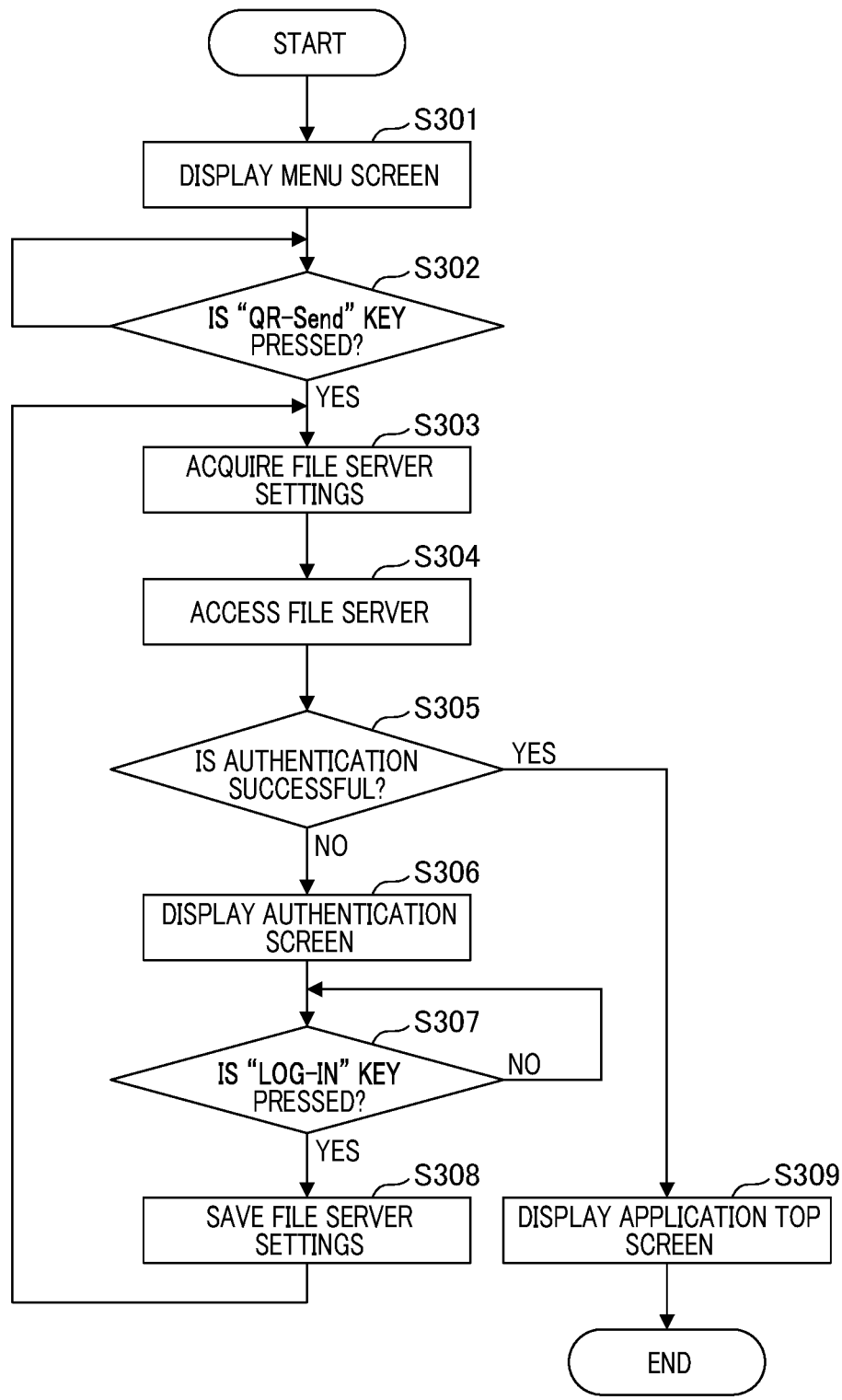

| Page No. | QR code information | Status | Progress bar start position |
|---|---|---|---|
| 1 | QRSD TOP invoice | Unprocessed | 80 |
| 2 | (No QR code) | Unprocessed | – |
| 3 | (No QR code) | Unprocessed | – |
| 4 | QRSD COVER Company A¥receipt | Unprocessed | 272 |
| 5 | (No QR code) | Unprocessed | – |
| 6 | QRSD TOP Order sheet | Unprocessed | 400 |
| 7 | (No QR code) | Unprocessed | – |
| 8 | (No QR code) | Unprocessed | – |
| 9 | (No QR code) | Unprocessed | – |
| 10 | (No QR code) | Unprocessed | – |

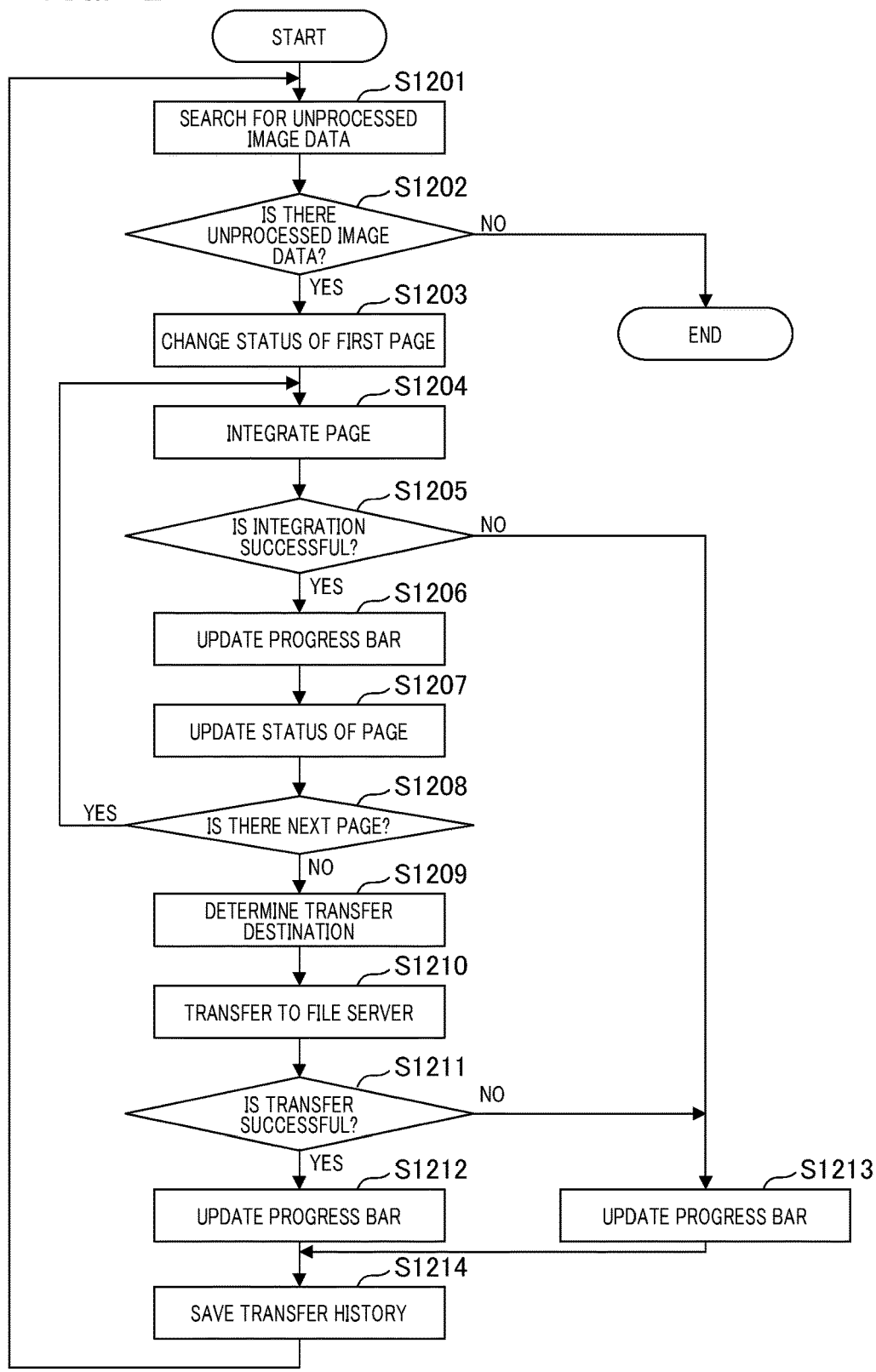

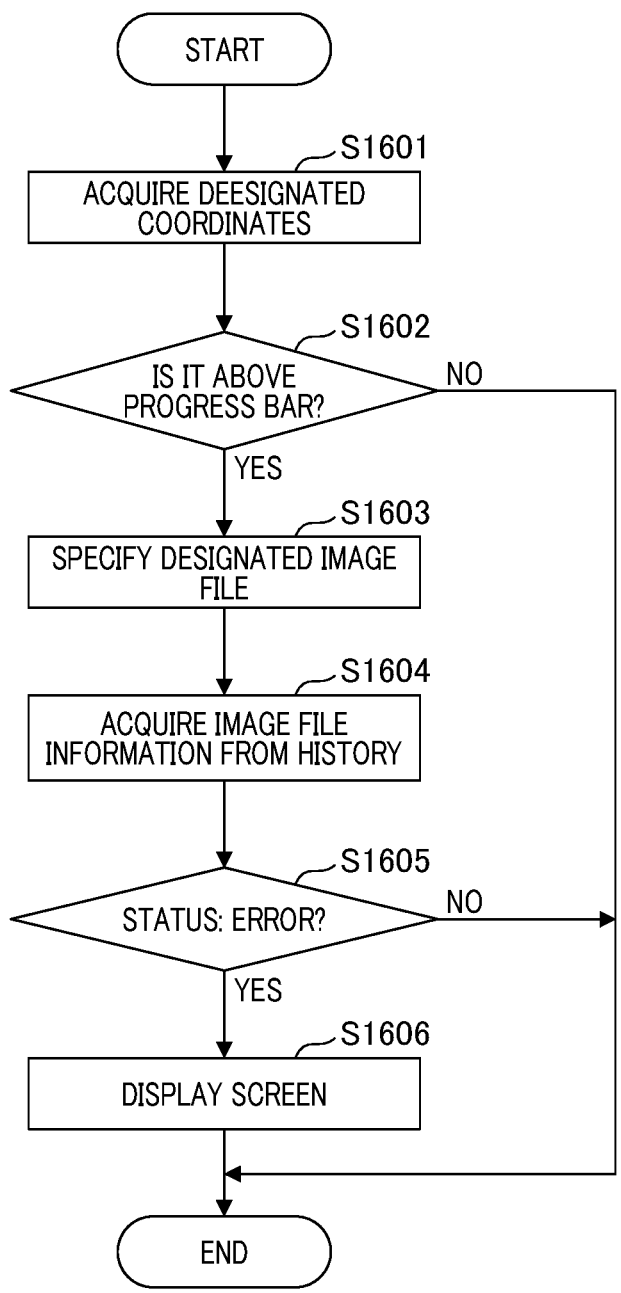

INFORMATION PROCESSING APPARATUS, CONTROL METHOD OF INFORMATION PROCESSING APPARATUS, AND RECORDING MEDIUM

BACKGROUND OF THE INVENTION

Field of the Invention

The present invention relates to an information processing apparatus, a control method of the information processing apparatus, and a recording medium.

Description of the Related Art

A scanner device capable of scanning a manuscript, converting it into an electronic file, and storing the file in a folder in an external device such as a PC or a file server on a network is known.

In the related art, if scanning processing is performed by setting a plurality of manuscripts on a scanner device, all of the plurality of scanned manuscripts are saved in one file. However, in such a method, if a plurality of sets of documents are scanned and individually converted into files, it is necessary to set each manuscript group constituting a set of documents on a scanner device and perform scanning processing, and it takes time and effort. In contrast, a method for collectively scanning a plurality of sets of documents, and saving each set of documents individually into a file has been proposed. For example, there is a method of executing scanning processing by inserting a partition sheet (cover sheet) with a code attached between manuscript groups constituting respective documents, and dividing manuscript groups on the basis of the partition paper into a file by one set.

If the plurality of sets of collectively scanned documents are converted into files individually for each set of documents, it is required to display a processing state of each document processed in parallel on a screen so that a user can ascertain a processing status. Japanese Patent Laid-Open No. 2013-001059 discloses a technology of processing a plurality of pages of page description language (PDL) data in parallel and presenting the number of pages on which PDL data processing is completed to a user. In addition, Japanese Patent Laid-Open No. 2013-145585 discloses a technology of arranging and displaying rectangles (hereinafter referred to as progress bars) each having a length proportional to a job processing time for each printer and a color corresponding to the state in the schedule view at regular intervals.

However, although Japanese Patent Laid-Open No. 2013-001059 indicates a PDL processing status, it does not consider indicating a processing status of each document at the time of collectively scanning a plurality of sets of documents. In addition, Japanese Patent Laid-Open No. 2013-001059 is based on the premise of a display on a display screen having a large area such as a PC display. If a plurality of progress bars are displayed side by side in an MFP or the like with a small screen size, they do not fit on the screen. As a result, it is necessary to perform scrolling and the clarity of the processing statuses may be impaired.

SUMMARY OF THE INVENTION

The present invention provides an information processing apparatus with which both a processing status of all of a plurality of documents to be processed and a processing status of an individual document can be easily ascertained even on a small screen.

The information processing apparatus of the present invention is an information processing apparatus executing processing on a plurality of documents, and includes a dividing unit configured to divide an area for indicating a progress status of processing for all of a plurality of documents into individual areas for indicating a progress status of processing for each of the plurality of documents, and a display unit configured to display a progress status of processing for each corresponding document in the individual area obtained by division by the dividing unit.

Further features of the present invention will become apparent from the following description of exemplary embodiments with reference to the attached drawings.

BRIEF DESCRIPTION OF THE DRAWINGS

FIG. 3 is a flowchart which shows an operation of an MFP 101.
FIG. 12 is a flowchart which shows the operation of the MFP 101.
FIG. 16 is a flowchart which shows the operation of the MFP 101.

DESCRIPTION OF THE EMBODIMENTS

First Embodiment

Figure 1:
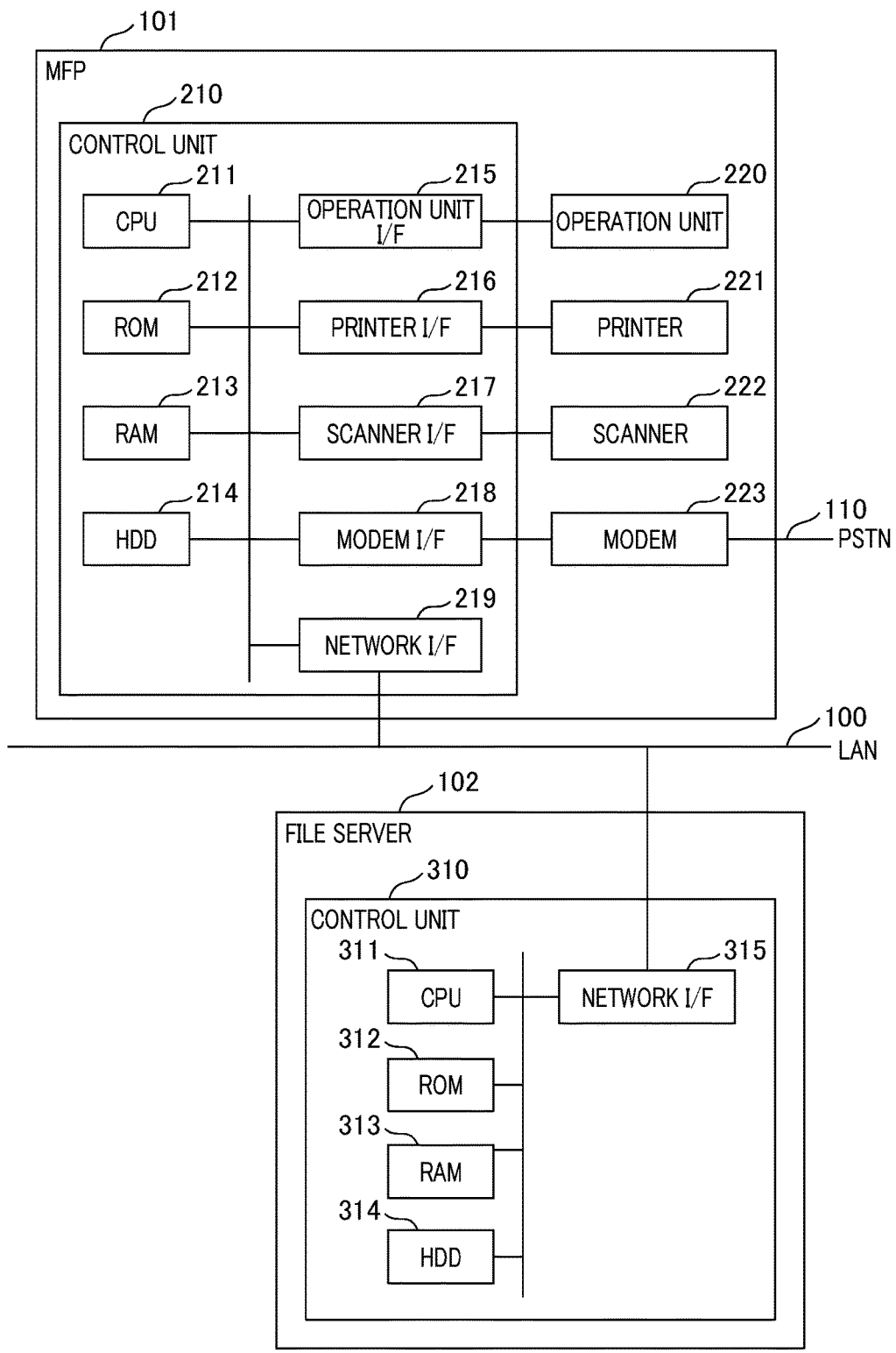
FIG. 1 is an overall view of an information processing system.

FIG. 1 is a block diagram which shows a configuration example of an information processing system according to the present embodiment. The information processing system includes a multifunction peripheral (MFP) 101 and a file server 102. The MFP 101 and the file server 102 are connected to be able to communicate with each other via a local area network (LAN) 100. In the present embodiment, the information processing system is constituted by the MFP 101 and the file server 102, but the function of the file server 102 may be combined with the MFP 101. In addition, the file server may be configured as a server on the Internet or as a cloud system.

First, each constituent included in the MFP 101 will be described. The MFP 101 is a multifunctional peripheral device including a plurality of functions such as a scan function, a FAX function, or a copy function. In the present embodiment, the MFP 101 will be described as an example of an information processing apparatus.

The MFP 101 includes an operation unit 220, a printer 221, a scanner 222, and a modem 223 for executing facsimile communication, and includes a control unit 210 for controlling an operation of an entire MFP. In the control unit 210, a central processing unit (CPU) 211, a read only memory (ROM) 212, a random access memory (RAM) 213, a hard disk drive (HDD) 214, and various types of I/Fs (an operation unit I/F 215 to a network I/F 219) are connected via a system bus.

The CPU 211 reads a control program stored in the ROM 212 and performs various types of control such as reading, printing, or communication. The RAM 213 is used as a temporary storage area such as a main memory or a work area of the CPU 211. The HDD 214 stores image data or various types of programs. The MFP 101 in the present embodiment executes various types of processing shown in a flowchart to be described using one memory (the RAM 213 or the HDD 214) by one CPU 211. However, the present embodiment is not limited thereto, and the various types of processing may also be executed by using a plurality of CPUs and a plurality of RAMs or HDDs in cooperation.

An operation unit I/F 215 is an interface for connecting the operation unit 220 and the control unit 210. In the operation unit 220, a display device such as a liquid crystal screen having a touch panel function, a button board, or the like is included. Operations, inputs, and instructions from a user are received.

A printer I/F 216 is an interface which connects the printer 221 and the control unit 210. Image data printed by the printer 221 is transferred to the printer 221 from the control unit 210 via the printer I/F 216 and printed on a recording medium such as paper by the printer 221.

A scanner I/F 217 is an interface for connecting the scanner 222 and the control unit 210. The scanner 222 generates image data by reading an image on a manuscript and inputs the image data into the control unit 210 via the scanner I/F 217.

After converting the image data generated by the scanner 222 into a file, the MFP 101 can transmit the file to the file server 102 using a server message block (SMB) protocol. Converting the data into a file means generating a file including image data, and a file format can be anything such as PDF or TIFF. In the following, one to a plurality of pages of image data which are converted into one file in a designated file format are referred to as an image file. Instead of SMB, a file transfer protocol (FTP) or web-based distributed authoring and versioning (WEBDAV) may also be used.

A modem I/F 218 is an interface for connecting the modem 223 and the control unit 210. The modem 223 executes facsimile communication of image data with a facsimile device that is not shown via a public switched telephone network (PSTN) 110.

A network I/F 219 is an interface for connecting the control unit 210 of MFP 101 to the LAN 100. The MFP 101 transmits image data or information to an external device such as the file server 102 on the LAN 100 or receives various types of information via the network I/F 219.

Next, each constituent included in the file server 102 will be described. The file server 102 is a server which stores and manages a received file with a specified file name and a specified folder name. The file server 102 includes a control unit 310 for controlling operation of an entirety of the file server 102. In the control unit 310, a CPU 311, a ROM 312, a RAM 313, and an HDD 314 are connected via a system bus.

The CPU 311 reads a control program stored in the ROM 312 and executes various types of control processing. The RAM 313 is used as a temporary storage area such as a main memory or a work area of the CPU 311. The HDD 314 stores image data or various types of programs. A network I/F 315 is an interface for connecting the control unit 310 of the file server 102 to the LAN 100. The file server 102 transmits or receives various types of information with other devices such as the MFP 101 on the LAN 100 via the network I/F 315.

Figure 2:
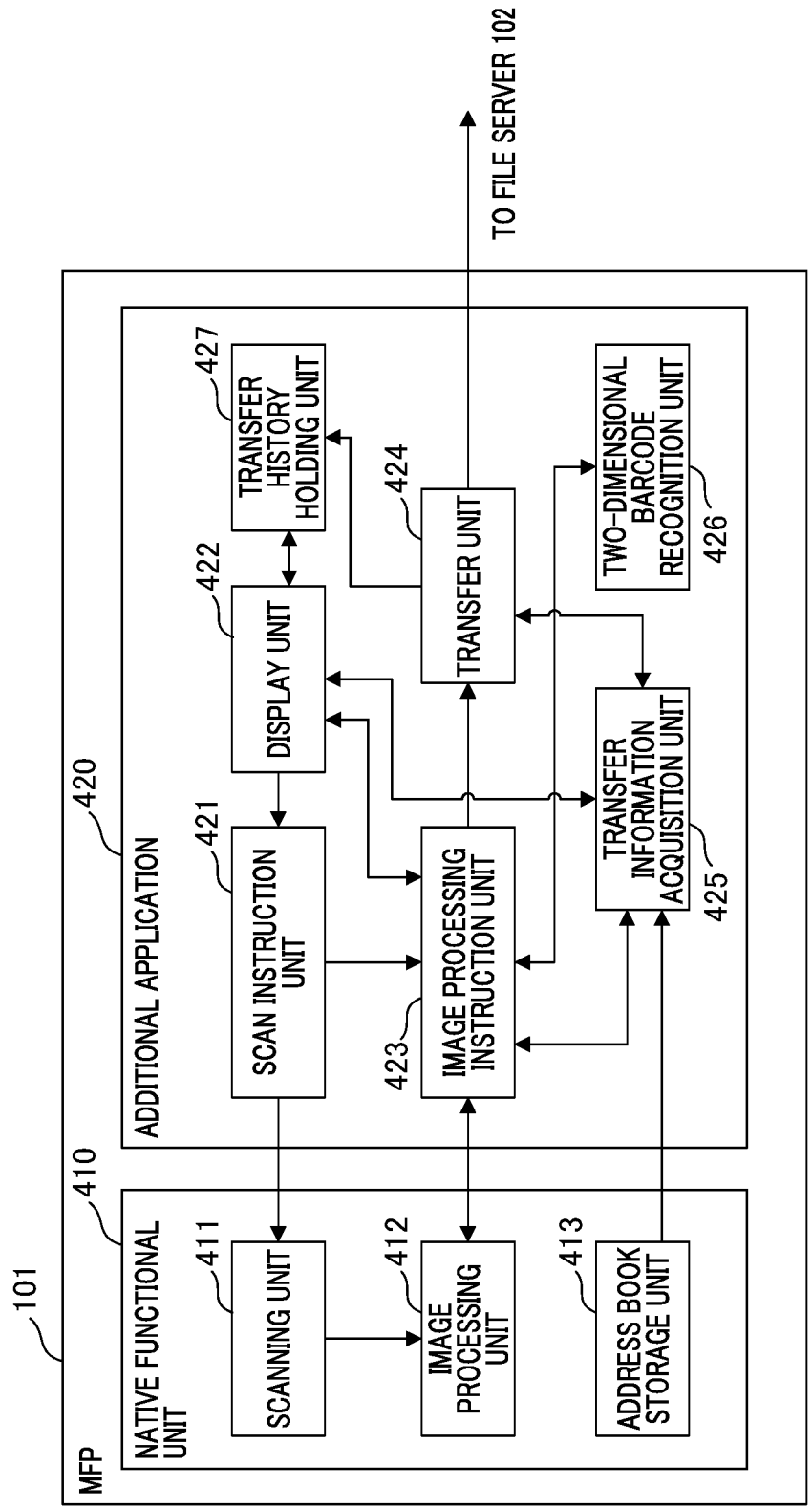
FIG. 2 is a software configuration diagram of the information processing system.

FIG. 2 is a software configuration diagram of the MFP 101. The MFP 101 includes a native functional unit 410 and an additional application 420. Each unit included in the native functional unit 410 is standardly included in the MFP 101, whereas the additional application 420 is an application additionally installed in the MFP 101. The additional application 420 is a Java (registered trademark) based application, and can easily realize function addition to the MFP 101. [QR-Send] is installed as the additional application 420 in the present embodiment. Other applications (not shown) may be installed in MFP 101.

First, a configuration of the native functional unit 410 will be described. The native functional unit 410 includes a scanning unit 411, an image processing unit 412, and an address book storage unit 413.

The scanning unit 411 receives a scan request including scan settings from the scan instruction unit 421, and performs scanning of a plurality of sets of documents together using the scanner 222 via the scanner I/F 217. The scanner 222 reads each page of a scanned document to generate image data constituted by a plurality of pages as scanning processing, and outputs generated image data to the scanning unit 411. The scanning unit 411 which has received image data outputs the image data to the image processing unit 412.

The image processing unit 412 first transitorily stores image data received from the scanning unit 411. If the image data is completely stored, a storage completion notification of image data to the image processing instruction unit 423a is performed. Then, if an image processing request including output settings is received from the image processing instruction unit 423, the image processing unit 412 outputs an image file which is a result of image processing in accordance with the image processing request. The output settings included in the image processing request are settings of a file format, a page number, and the like. For example, in the case of the output settings in which the file format is joint photographic experts group (JPEG) and an output page is described as 1, a first page of image data is output as a JPEG file. In addition, if a file format is a portable document format (PDF) and output pages in the output settings are described as 2, 3, and 4, 2, 3, and 4 pages of image data are combined to be output as one PDF file.

The address book storage unit 413 stores address information registered by a user of the MFP 101. The address information refers to file server information and the like for transferring a fax number, an E-mail address, and a file. In the file server information, a host name, information of a root folder which is a base point of a folder path, and authentication information (ID and password) can be set.

Next, an internal configuration of the additional application 420 will be described. The additional application 420 includes the scan instruction unit 421, a display unit 422, the image processing instruction unit 423, a transfer unit 424, a transfer information acquisition unit 425, a two-dimensional barcode recognition unit 426, and a transfer history holding unit 427.

The scan instruction unit 421 receives input information from a user which is input via the display unit 422, and requests the scanning unit 411 to perform scanning processing along with scan settings and the like included in the input information. Then, information on the scan settings and the like included in the input information is output to the image processing instruction unit 423.

The display unit 422 displays a progress status of processing for a document or a UI for receiving an operation/input/instruction from a user on a display device having a touch panel function included in the operation unit 220 of the MFP 101. Details of a screen to be displayed will be described below.

The image processing instruction unit 423 first transitorily stores information received by the scan instruction unit 421. Then, if the storage completion notification of image data is received from the image processing unit 412, the image processing instruction unit 423 transmits an image processing request including output settings based on information on scan settings and the like received from the scan instruction unit 421 to the image processing unit 412. An initial image processing request includes, for example, output settings which instruct generation of an image file for performing sequential barcode recognition processing on image data of each scanned page. Then, the image processing instruction unit 423 receives an image file generated on the basis of the image processing request by the image processing unit 412. The image processing instruction unit 423 transmits an image file obtained from the image processing unit 412 to the two-dimensional barcode recognition unit 426, requests barcode recognition processing (analyzing processing to analyze a separation position for each document on the basis of a barcode), and receives a result of the analysis. Then, the image processing instruction unit 423 transmits an image processing request for generating a set of image files for each document on the basis of the separation position for each document included in the result of the analysis to the image processing unit 412. The image processing instruction unit 423 instructs (transmits) the transfer unit 424 to transfer a file transfer request including an image file for each document received from the image processing unit 412 and transfer information (information indicating a transfer destination) acquired from the transfer information acquisition unit 425. In addition, the image processing instruction unit 423 generates a progress bar indicating a progress status to present the progress status of processing to a user, and requests the display unit 422 to appropriately update the display.

The transfer unit 424 transfers (transmits) an image file to an external device using a protocol such as a server message block (SMB). In the present embodiment, the transfer unit 424 transfers an image file to the file server 102 which is a transfer destination specified by transfer information using an SMB in accordance with a file transfer request including the transfer information and the image file received from the image processing instruction unit 423. Then, the transfer unit 424 saves transfer history information such as whether an image file transfer is completed or has failed in the transfer history holding unit 427. A file transfer protocol (FTP) or web-based distributed authoring and versioning (WEBDAV) may also be used instead of the SMB for the transfer of an image file by the transfer unit 424.

The transfer information acquisition unit 425 acquires transfer information which is information on a transfer destination of an image file by the address book storage unit 413. In the present embodiment, the transfer destination information is acquired by the address book storage unit 413 in the native functional unit 410, but transfer destination information held in the additional application 420 may also be used. The transfer information acquisition unit 425 can be used by each functional unit in the additional application 420, and is used for allowing the display unit 422 and the image processing instruction unit 423 to acquire transfer destination information in the present embodiment.

In accordance with an image file and a barcode recognition processing request received from the image processing instruction unit 423, the two-dimensional barcode recognition unit 426 performs recognition and analysis of two-dimensional barcodes on image data of each page included in the image file. Then, the two-dimensional barcode recognition unit 426 outputs a result of the analysis to the image processing instruction unit 423. In the present embodiment, a QR code (registered trademark) included in an image as a two-dimensional barcode is recognized and analyzed. The two-dimensional barcode is not limited to a QR code, and may be a one-dimensional barcode, a two-dimensional barcode other than a QR code, or the like which can store information in an image. The result of the analysis includes identification information indicating that a QR code is a QR code used in the additional application 420, manuscript type information indicating whether a page to which the QR code is given is a first page of each document or a cover sheet attached to the beginning of each document, and transfer destination path and file name information.

The transfer history holding unit 427 holds transfer history information such as whether an image file transfer has succeeded or failed.

FIG. 3 is a flowchart which describes operations from a start of the MFP 101 to a display of an application top screen 610 of the additional application 420 (hereinafter, description is provided using an example of an application named "QR-Send"). Details of the application top screen 610 will be described below using FIG. 5. Processing of each step in the flowchart of FIG. 3 is realized by the CPU 211 of the MFP 101 executing a control program stored in the HDD 214.

Figure 4A:
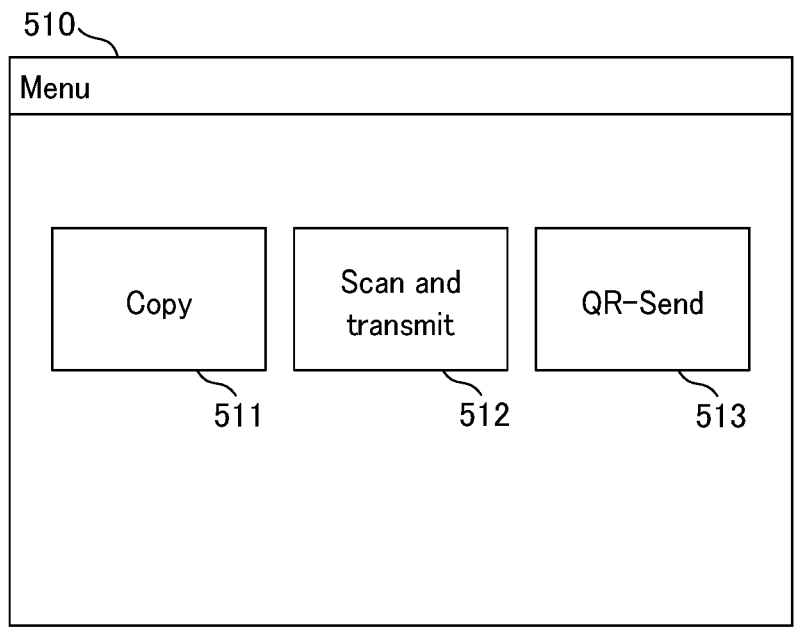
FIGS. 4A and 4B are diagrams which show an operation screen of the MFP 101.

If the MFP 101 starts, the menu screen 510 shown in FIG. 4A is first displayed on the operation unit 220 in step S310. Functions and applications included in the MFP 101 are listed and displayed in the menu screen 510. A "copy" key 511, a "scan" key 512, and a "QR-Send" key 513 are displayed in the present embodiment. The "copy" key 511 and the "scan" key 512 which is displayed as "scan and transmit" are operation keys corresponding to functions standardly included in the MFP 101 (native functions). On the other hand, the "QR-Send" key 513 is an operation key corresponding to a Java (registered trademark) based application additionally installed in the MFP 101. This represents the [QR-Send] which is the additional application 420. Other native functions or other applications (not shown) may also be included in the MFP 101.

In step S302, it is determined whether the "QR-Send" key 513 is pressed. If the "QR-Send" key 513 is pressed, the procedure proceeds to step S303, and if the "QR-Send" key 513 is not pressed, pressing of the key is awaited. If the "copy" key 511 or the "scan" key 512 is pressed, the corresponding function is executed (not shown).

In step S303, the transfer unit 424 acquires file server settings saved in the HDD 214. Specifically, the transfer unit 424 acquires information on the file server 102 stored in the address book storage unit 413 via the transfer information acquisition unit 425.

The file server settings include a host name of the file server 102 and information on a root folder which is a start point of a folder path. In the present embodiment, it is assumed that a host name is "192.168.1.2," and a root folder including the host name is "192.168.1.2¥share¥folder¥." Furthermore, the file server settings include authentication information (ID and password) for logging in to the file server 102. Each piece of information included in the file server settings is assumed to be information input in advance by an administrator or a user of the MFP 101 via the operation unit 220 or an address book setting screen displayed on a PC (not shown).

In step S304, the transfer unit 424 executes access to the file server 102 on the basis of the file server settings acquired in step S303.

In step S305, it is determined whether the access of step S304 has succeeded, that is, whether authentication on the file server 102 has succeeded to enable log-in. If the access has succeeded, the procedure proceeds to step S309, and if the access has failed, the procedure proceeds to step S306.

Figure 4B:
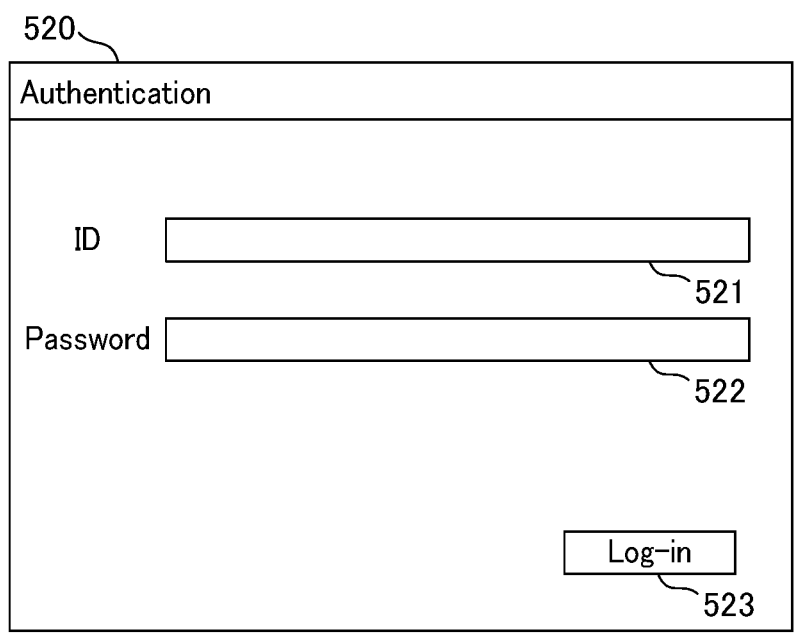

In step S306, the authentication screen 520 shown in FIG. 4B is displayed on the operation unit 220.

If access to the file server 102 has failed, it is considered that there is possibly an error in the authentication information included in the file server settings, and thus a user is asked to input authentication information via the authentication screen 520. On the authentication screen 520, an ID input field 521 for inputting an ID, a password input field 522 for inputting a password, and the [log-in] key 523 are displayed.

In step S307, it is determined whether the [log-in] key 523 is pressed. If the [log-in] key 523 is pressed, the procedure proceeds to step S308, and if it is not pressed, pressing of the [log-in] key 523 is awaited.

In step S308, the authentication information input by a user is saved in the HDD 214 and the procedure returns to step S303. By performing the processing of S308, a user does not need to input authentication information at the time of a next and subsequent log-in, but the procedure may return to step S304 by omitting the processing of step S308 and step S303.

Figure 5:
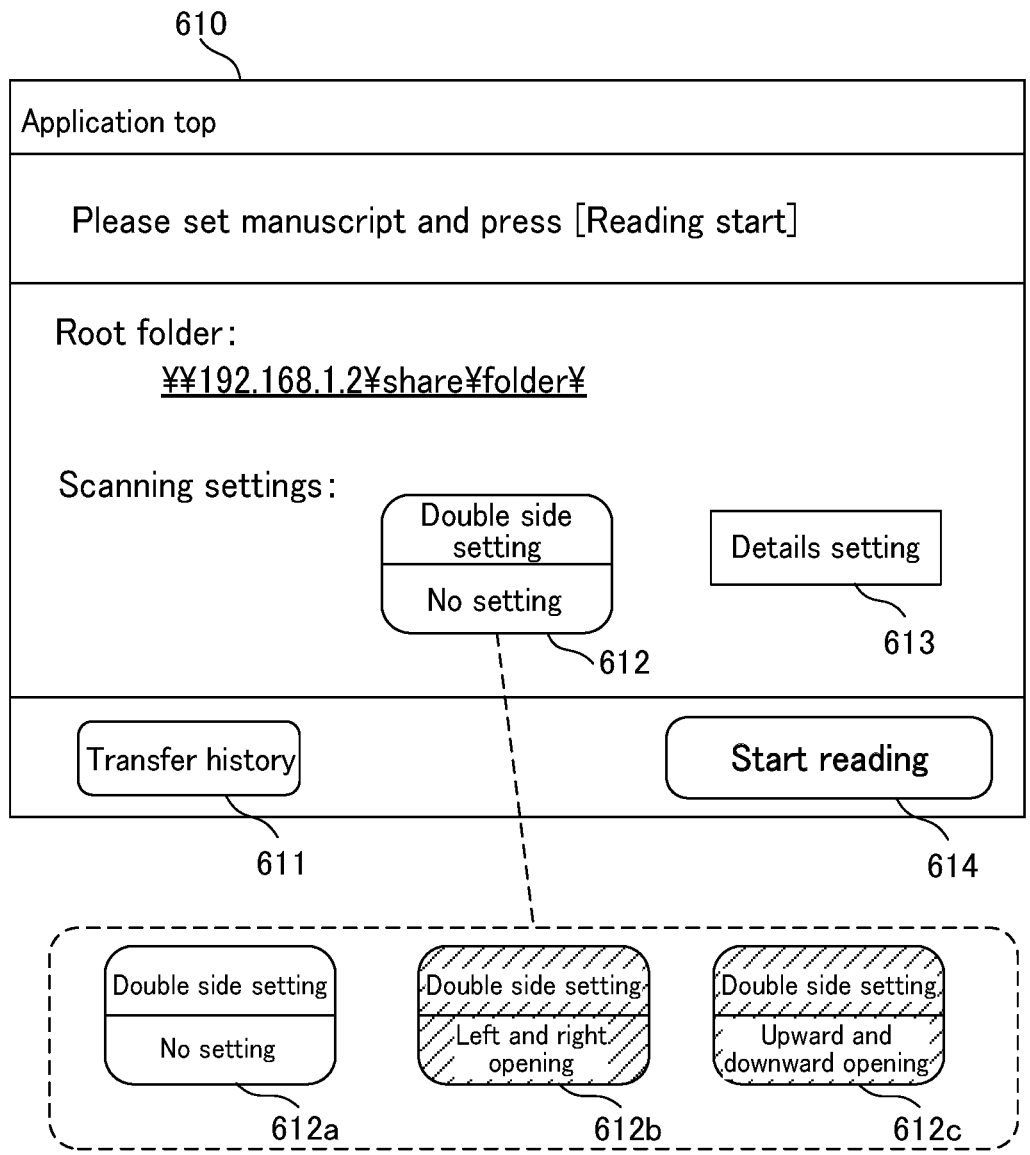
FIG. 5 is a diagram which shows the operation screen of the MFP 101.

In step S309, the application top screen 610 shown in FIG. 5 is displayed on the operation unit 220 and the processing ends.

FIG. 5 is an example of the application top screen 610 displayed on the operation unit 220 by the processing of step S309. Various types of descriptions and a [transfer history] key 611 to a [reading start] key 614 are displayed on the application top screen 610.

Hereinafter, respective keys 611 to 614 will be described. If the [transfer history] key 611 is pressed, a screen for showing a transfer history list is displayed. Since display of a transfer history list itself is not important, it is not shown in the present embodiment. A [double-side setting] key 612 and a [details setting] key 613 are operation keys for setting a reading parameter of a manuscript. The [double-side setting] key 612 is an operation key for setting a double-side mode. Each time it is pressed, the display is switched to a display of a key 612a without double-side setting, a key 612b for a left and right opening, and a key 612c for an upward and downward opening, and a user can set a desired reading parameter. The [details setting] key 613 displays a screen (not shown) capable of setting a reading parameter of a manuscript, and a user can set a desired reading parameter. The reading parameter of a manuscript refers to a color mode (color, grayscale, and monochrome), a resolution, a file format, and the like. A type of the reading parameter may further include an item other than the items described above. If a [reading start] key 614 is pressed, reading of a manuscript and transmission of an image file to the file server 102 are executed.

Figure 6:
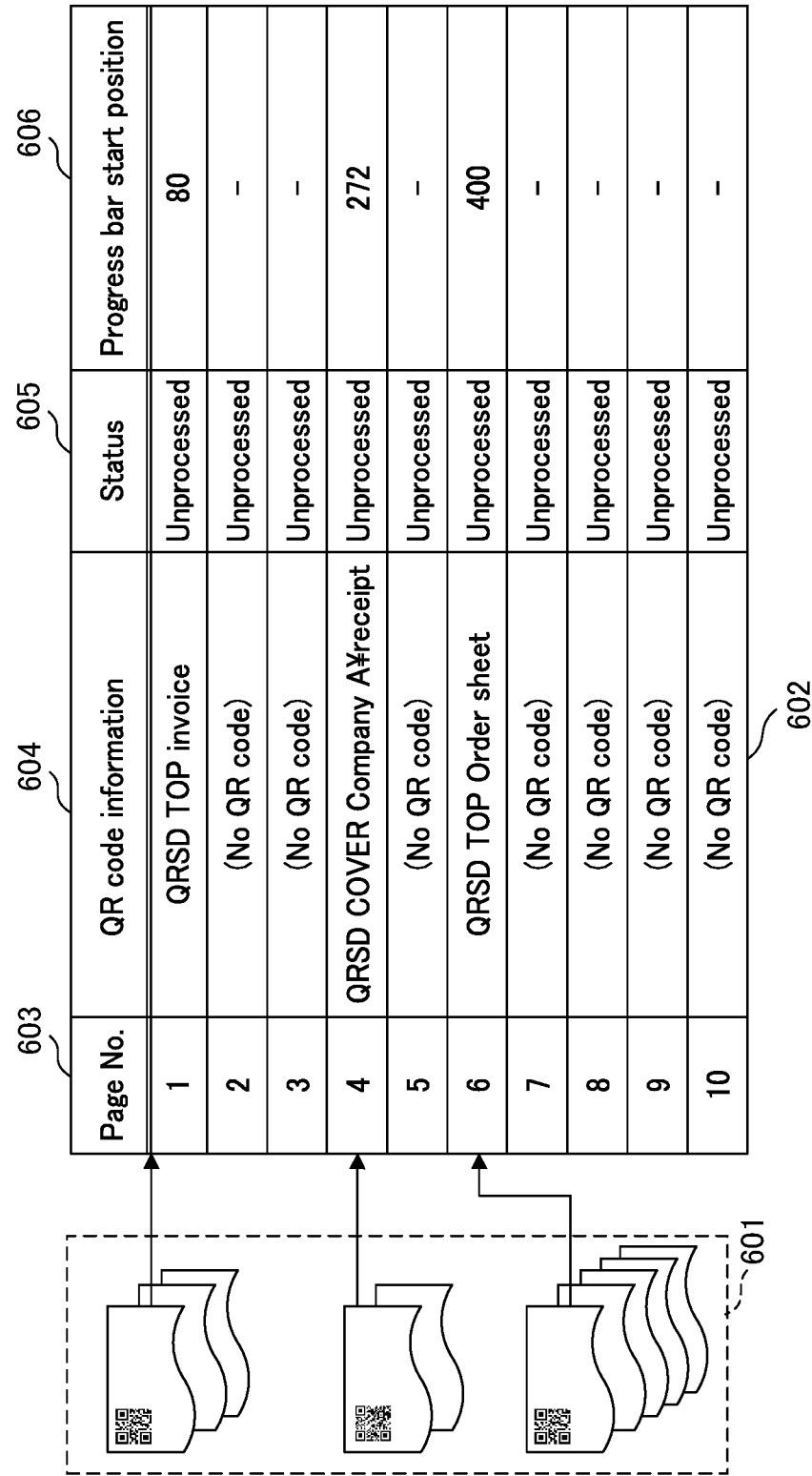
FIG. 6 is a diagram which shows manuscript examples to be scanned and given QR code information.

FIG. 6 is a diagram which shows a configuration example of image data in the case in which a plurality of sets of documents are continuously scanned when the [reading start] key 614 of the application top screen 610 of FIG. 5 is pressed. A document set 601 shows a plurality of sets of documents read in one scanning, and is an example in which three sets of documents (a total of 10 sheets of manuscript) are collectively scanned. In an example of FIG. 6, a first set of documents is a manuscript constituted by three pages, a second set of documents is a manuscript constituted by two pages, and a third set of documents is a manuscript constituted by five pages. QR code information is given to a first page or a cover sheet as a delimiter of the manuscripts, a document delimiter is determined using the QR code information, and finally one image file is generated for each document.

A table 602 shows a data format which holds a scanned manuscript during processing, and holds information of 603 to 606 in units of pages. A page No. 603 holds a page number representing a scan order of all of the manuscripts collectively scanned. A QR code information 604 holds information set in QR codes given to the scanned manuscripts.

In the present embodiment, it is assumed that the QR code information 604 includes at least identification information, manuscript type information, and transfer destination path and file name information. The identification information is information for identifying that a given QR code is a QR code used in the additional application 420. In the present embodiment, if a character string of "QRSD" is described at a head of the QR code information, it is determined that a given QR code is the QR code used in the additional application 420. The manuscript type information is information for showing whether a manuscript page to which a QR code is given is a first page of the documents or a cover sheet inserted at the beginning of a document body. In the present embodiment, it is determined that a manuscript page is a first page if "TOP" is described after identification information, and it is determined that the manuscript page is a cover sheet if "Cover" is described after the identification information.

The transfer destination path and file name information indicate a relative path and a file name starting from a root folder. In the present embodiment, it is assumed that an invoice is included in QR code information corresponding to a page No. 1 of the table 602. In addition, since a character string with a file name extension (for example, pdf) of a file at the end is a file name, and does not include information on a relative path, a transfer destination is a root folder. In the same manner, it is assumed that "Company A¥receipt" is included in QR code information corresponding to a page No. 4. In this case, a file name is "receipt.pdf," and a transfer destination is a "Company A" folder which exists under the root folder. In the example of FIG. 6, a manuscript to which a QR code is not given is indicated as "no QR code," but this means that a recognition result is empty or there is no information.

A status 605 is used to represent a processing status of each page of a scanned manuscript. A status immediately after a scan is set to "unprocessed," and a status after image data processing is set to "processed." A progress bar start position 606 is used to represent a coordinate value on a horizontal axis which indicates a position on one progress bar at which a processing status of a first manuscript (a manuscript with a QR code) of each document is displayed. That is, the progress bar start position 606 shows coordinates of a boundary between documents on one progress bar.

Figure 7:
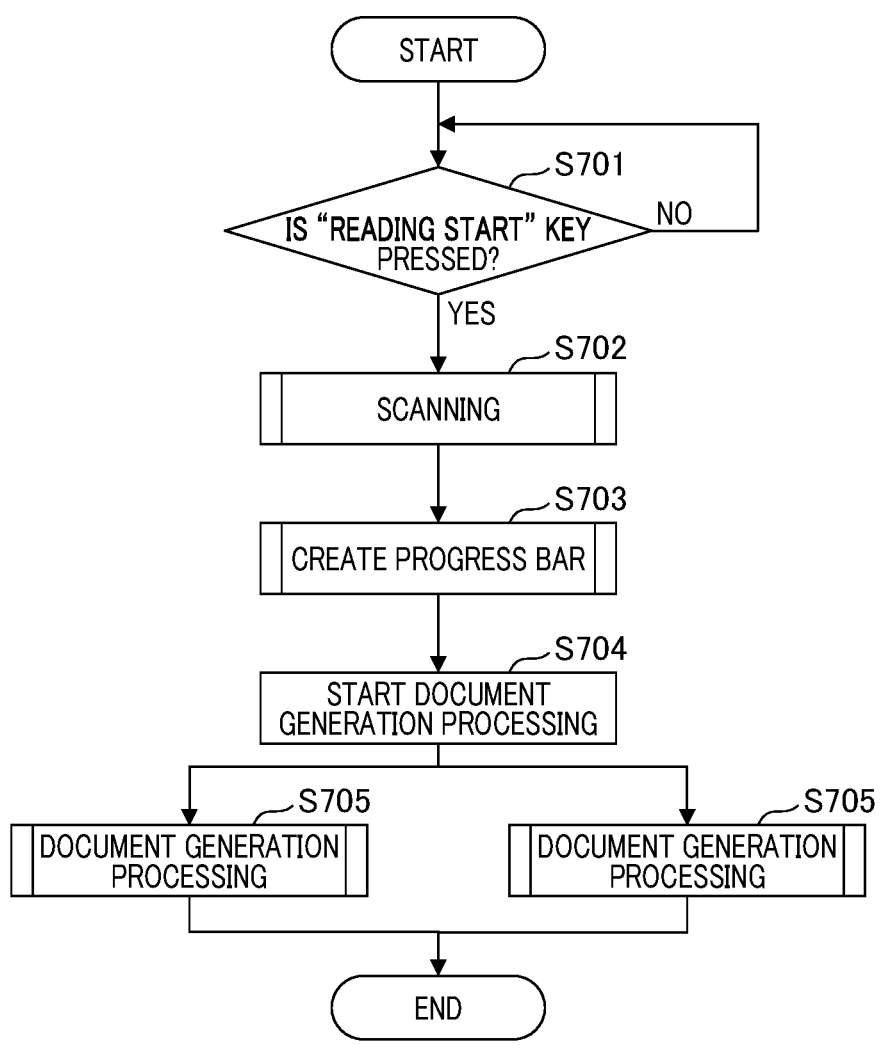
FIG. 7 is a flowchart which shows an operation of the MFP 101.

FIG. 7 is a flowchart which describes an operation of the MFP 101 after the application top screen 610 is displayed. Each operation (step) shown in the flowchart of FIG. 7 is realized by the CPU 211 of the MFP 101 executing a control program stored in the HDD 214.

In step S701, the display unit 422 determines whether a [reading start] key 614 of the application top screen 610 is pressed. If the [reading start] key 614 is pressed, a scan instruction (scan request) is transmitted to the scanning unit 411 from the scan instruction unit 421 and the procedure proceeds to step S702. If the [reading start] key 614 is not pressed, pressing is awaited.

In step S702, the scanning unit 411 reads all pages of a plurality of sets of documents set by a user on the basis of a scan instruction from the scan instruction unit 421, and generates image data. A detailed processing procedure of the present step will be described in FIG. 8.

In step S703, a processing status screen 1110 of an image file to be displayed during processing of generating an image file for each document from the image data generated in step S702 is generated. A detailed processing procedure of the present step will be described in FIGS. 9 and 10, and the processing status screen 1110 will be described below in FIGS. 11A to 11C.

In step S704, a start of document generation processing of generating an image file is controlled. Here, a number of steps S705 corresponding to the number of parallel processings set in advance in the system are started to generate a plurality of image files in parallel. In FIG. 7, an example in which two steps S705 are started and executed in parallel is described as an example, but this parallel processing is not limited to two steps, and may be more than two steps. The parallel processing can be realized by being executed using a plurality of processors or a plurality of cores.

In step S705, processing of generating an image file is performed and a generated image file is transferred to a transfer destination. A detailed processing procedure of the present step will be described below in FIG. 12. All the steps S705 starting in step S704 end, and thereby the present processing flow ends.

Figure 8:
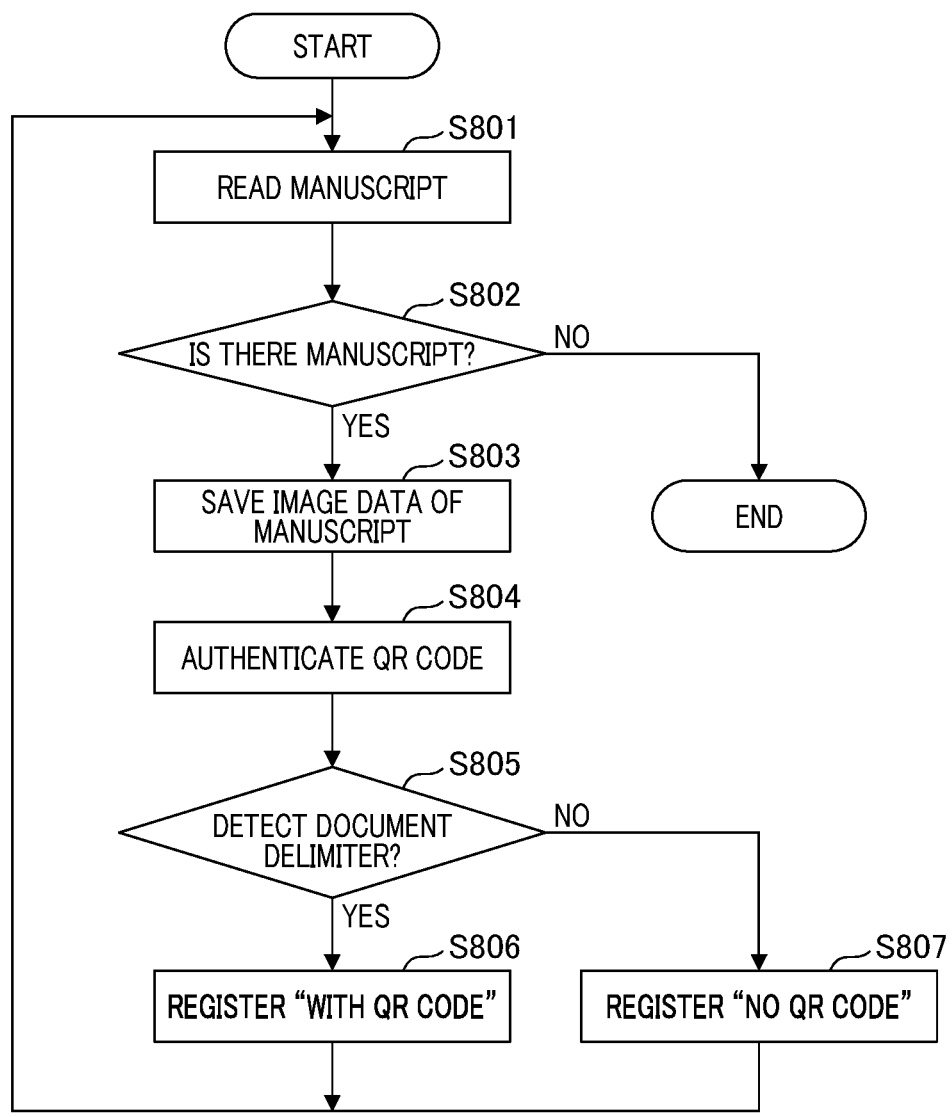
FIG. 8 is a flowchart which shows the operation of the MFP 101.

FIG. 8 is a flowchart which describes operations of scanning processing in step S702 of FIG. 7 in detail. The scanning processing is processing executed when the scan instruction unit 421 outputs a scan instruction to the scanning unit 411. Each operation (step) shown in the flowchart of FIG. 8 is realized by the CPU 211 of the MFP 101 executing a control program stored in the HDD 214.

In step S801, the scanning unit 411 executes reading of one page of the manuscript by the scanner 222. Hereinafter, the read manuscript is referred to as a scanned page.

In step S802, the scanning unit 411 determines whether reading of a manuscript is performed, that is, whether there is a read manuscript in step S801. If there is a read manuscript, the procedure proceeds to S803, and if there is no manuscript read, the processing ends. Even in the case in which each type of processing of FIG. 8 for all manuscripts ends, there is no reading of a new manuscript in S801 and it is determined that there is no manuscript read.

In step S803, image data of scanned pages is saved in the image processing unit 412. In the present embodiment, image data corresponding to the document set 601 is saved. If saving is completed, the image processing unit 412 notifies the image processing instruction unit 423 of completion of the saving.

In step S804, the two-dimensional barcode recognition unit 426 detects a QR code from image data of each page saved in the image processing unit 412, analyzes a detected QR code, and extracts the QR code information 604 described in the QR code. Specifically, the image processing instruction unit 423 instructs the two-dimensional barcode recognition unit 426 to perform barcode recognition processing and the two-dimensional barcode recognition unit 426 which receives an instruction performs barcode recognition processing.

In step S805, the two-dimensional barcode recognition unit 426 analyzes whether the QR code information 604 extracted in step S804 has a data configuration of the present embodiment, that is, whether the QR code information 604 is information indicating a document delimiter. Then, the two-dimensional barcode recognition unit 426 returns a result of the analysis to the image processing instruction unit 423. When the QR code information 604 has the data configuration of the present embodiment, the procedure proceeds to step S806, and when there are no QR codes or the QR code information 604 does not have the data configuration of the present embodiment, the procedure proceeds to S807.

In step S806, the image processing instruction unit 423 saves the page No. 603, the QR code information 604, and the status 605 in the RAM 213 as data in the form of the table 602. The RAM 213 is used in the present embodiment, but the HDD 214 may also be used. When saving of the data ends, the procedure returns to step S801.

In step S807, the image processing instruction unit 423 saves the page No. 603, the QR code information 604, and the status 605 in the RAM 213 as data in the form of the table 602. The RAM 213 is used in the present embodiment, but the HDD 214 may also be used. At this time, "no QR code" is set in the QR code information 604. When saving of the data ends, the procedure returns to step S801.

Figure 9:
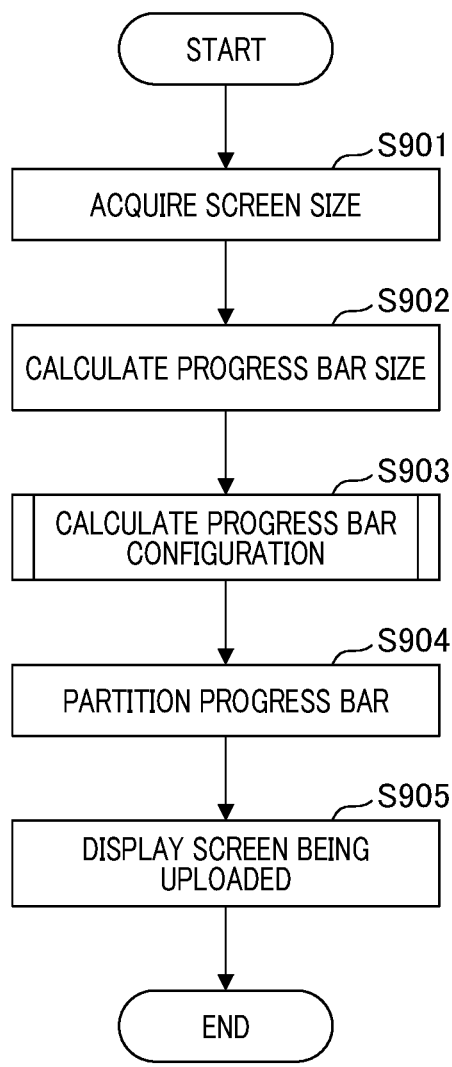
FIG. 9 is a flowchart which shows the operation of the MFP 101.
Figure 10:
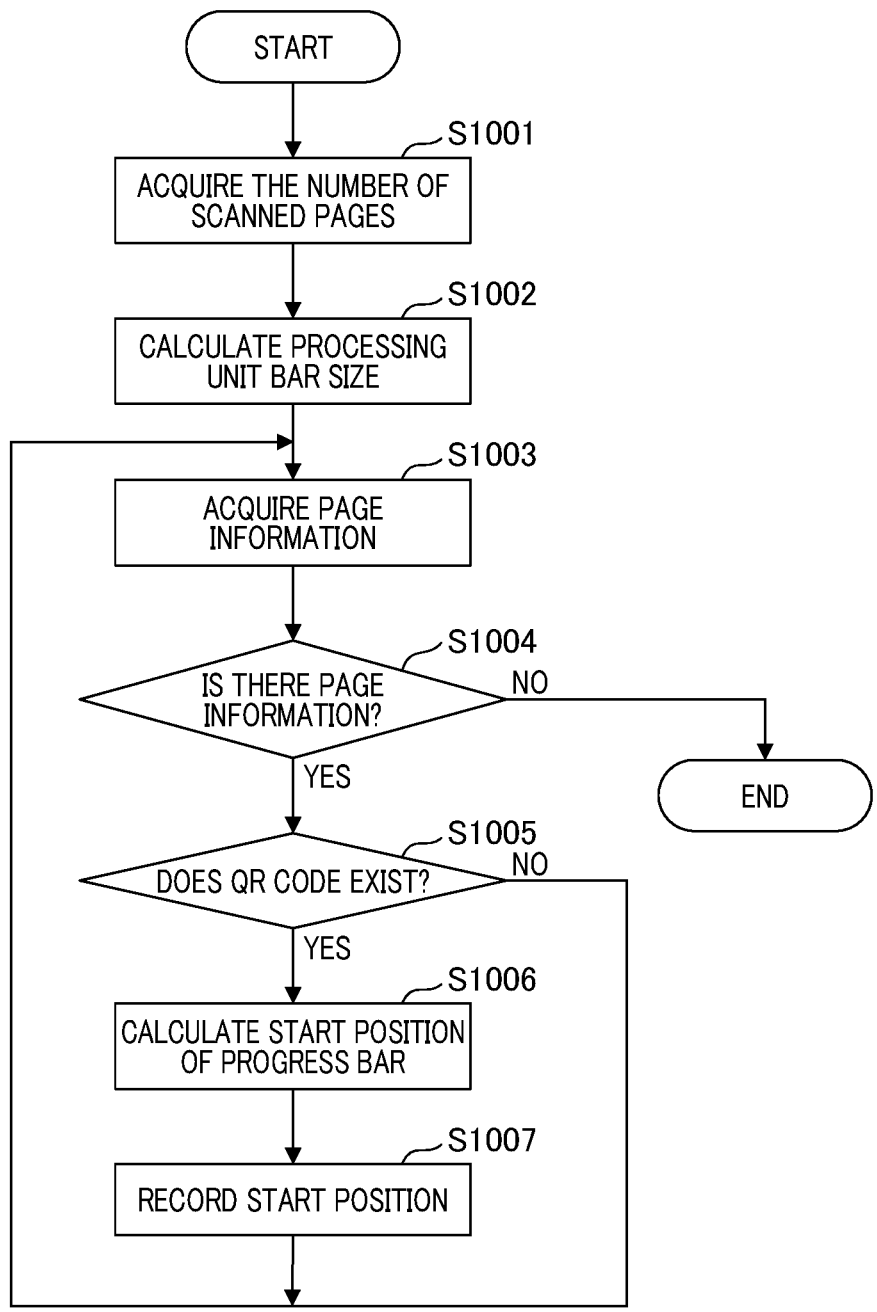
FIG. 10 is a flowchart which shows the operation of the MFP 101.

FIGS. 9 and 10 are flowcharts which describe an operation of the progress bar creation processing in step S703 of FIG. 7 in detail. The present processing is processing executed when the scan instruction unit 421 outputs an instruction to the image processing instruction unit 423 after scanning processing ends. Each operation (step) shown in the flowchart of FIGS. 9 and 10 is realized by the CPU 211 of the MFP 101 executing a control program stored in the HDD 214.

In step S901, the image processing instruction unit 423 acquires a screen size of the MFP 101 executing processing from the display unit 422. A size to be acquired here is the number of pixels in vertical and horizontal directions.

In step S902, the image processing instruction unit 423 calculates a size of an entire progress bar displayed on a screen on the basis of a screen size acquired in step S901. In the present embodiment, the size of an entire progress bar is displayed with 80% of the width of the screen size, but the size is not limited thereto.

In step S903, the image processing instruction unit 423 calculates a configuration of a progress bar on the basis of an image data amount (the number of pages) of each document to be processed. Details of S903 will be described with reference to FIG. 10. FIG. 10 is a flowchart which describes calculation processing of the configuration of a progress bar in detail.

In step S1001, the image processing instruction unit 423 acquires the total number of scanned pages to be processed from data in the form of the table 602 saved in the RAM 213.

In step S1002, the image processing instruction unit 423 divides the number of pixels in the width of the progress bar calculated in step S902 by the total number of scanned pages acquired in step S1001, and calculates the number of width pixels for each scanned page (this is an incremental width of the progress of each page).

In step S1003, the image processing instruction unit 423 acquires information (page information) of each page saved in the table 602. In step S1003, the information is acquired piece by piece in ascending order of the size of the page No. 603.

In step S1004, the image processing instruction unit 423 determines whether information on a next page can be acquired in step S1003. When the information has been acquired, the procedure proceeds to S1005, and if the information is not acquired, the present flowchart ends and the procedure proceeds to step S904 of FIG. 9. If information on a last page is completely acquired, it is determined that information on a next page has not been acquired.

In step S1005, the image processing instruction unit 423 determines whether there is QR code information in the QR code information 604 included in the page information acquired in step S1003. If there is QR code information, the procedure proceeds to step S1006, and if there is no QR code information, the procedure returns to S1003 and scanning data processing of a next page is performed.

In step S1006, the image processing instruction unit 423 calculates a start position of a progress bar. The start position is a separation position of a progress bar (hereinafter referred to as an image file progress bar) partitioned for each document (each image file to be output). Specifically, a start position of each document in a progress bar is calculated by multiplying the number of width pixels for each scanned page calculated in step S1002 and the number of scanned pages of the page No. 603 in which there is QR code information. This is used to display delimiters of the image file progress bars 1117 to 1119 of the progress bar 1116 of FIG. 11A to be described below.

In step S1007, the image processing instruction unit 423 saves a value of the start position calculated in step S1006 in the progress bar start position 606 of the table 602.

FIG. 9 will be described again.

In step S904, the image processing instruction unit 423 divides a display area of a horizontally long progress bar 1116 into individual areas 1117 to 1119 for each document on the basis of coordinate position information of the progress bar start position 606 saved in the table 602 in step S1007.

Figure 11A:
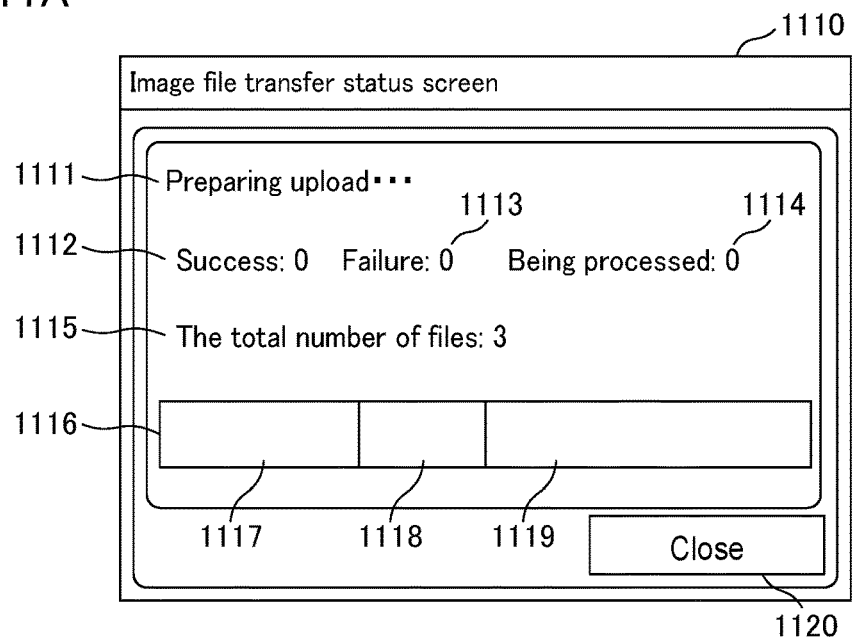
FIGS. 11A to 11C are diagrams which show an operation screen of the MFP 101.

In step S905, the image processing instruction unit 423 notifies the display unit 422 to display the processing status screen 1110 including the progress bar 1116 which is partitioned into partial areas for each document in step S904 as shown in FIG. 11A. The display unit 422 displays the processing status screen 1110 on the operation unit 220 on the MFP 101 on the basis of received information.

FIG. 11A is an example of the processing status screen 1110 displayed on the operation unit 220 by the processing of step S905. The processing status screen 1110 includes a status 1111, the number of successful image file transfers 1112, the number of failed image file transfers 1113, the number of ongoing image file transfers 1114, the total number of files 1115, a progress bar 1116, and a [close] key 1120.

The status 1111 indicates a description for indicating a latest status of the image file transfer. In the description displayed herein, an image file name to be displayed or a status changes according to a processing status.

The number of successful image file transfers 1112 indicates the number of image file transfers which have succeeded and ended, the number of failed image file transfers 1113 indicates the number of image file transfers which have failed in the process and ended, and the number of ongoing image file transfers 1114 indicates the number of currently ongoing image file transfers. The total number of files 1115 indicates the number of all image files (that is, the number of documents) to be processed.

The progress bar 1116 is display data which indicates a progress status of processing for all of a plurality of documents, and corresponds to a predetermined display area. In the display area of the present embodiment, a progress bar having a rectangular shape is displayed, but the present embodiment is not limited thereto, and the progress bar may have any shape such as a circular shape which can visually display a progress status of an entire scanned manuscript and an individual progress status for each document in one display area. The progress bar 1116 is displayed to be partitioned into areas of the image file progress bar 1117, the image file progress bar 1118, and the image file progress bar 1119 for each image file (document) on the basis of the QR code information 604. In the example of FIG. 11A, the progress bar 1116 at the time of continuously scanning the document set 601 of FIG. 6 (an example in which a document of a first set is composed of three pages, a document of a second set is composed of two pages, and a document of a third set is composed of five pages) is shown. A separation position of the progress bar 1116 (an individual area corresponding to each document) dynamically changes according to a page configuration of each document read at once.

If the [close] key 1120 is pressed, the processing status screen 1110 being displayed is closed. However, even if this processing status screen 1110 is closed, image file transfer processing itself is continued.

FIG. 12 is a flowchart which describes an operation of the document generation processing in step S705 of FIG. 7 in detail. The present processing is processing executed by the image processing instruction unit 423 after the image processing instruction unit 423 performs a display of the processing status screen 1110 through the display unit 422. By the present processing, the processing status screen 1110 of FIG. 11A changes display content as shown in FIG. 11B and FIG. 11C.

Figure 11B:
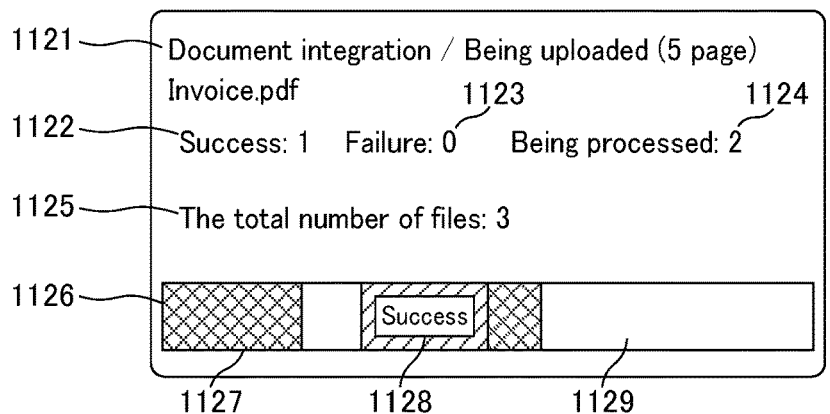

FIG. 11B is a diagram which exemplifies a portion of the processing status screen 1110 representing a status during the processing of the present flowchart. In FIG. 11B, a status 1121, the number of successful image file transfers 1122, the number of failed image file transfers 1123, the number of ongoing image file transfers 1124, the total number of files 1125, and a progress bar 1126 are included. The status 1121 to the progress bar 1126 correspond to the status 1111 to the progress bar 1116 of FIG. 11A.

Figure 11C:
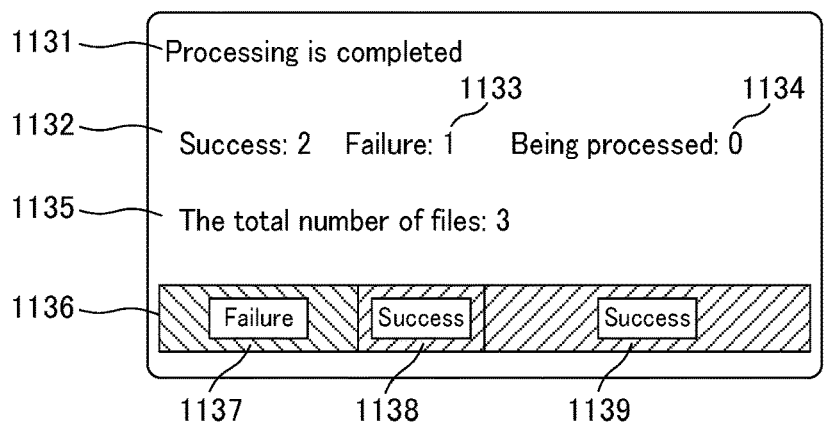

In FIGS. 11B and 11C, a shade pattern in a progress bar indicates an amount (the number of pages) of processed manuscript in an image file corresponding to each document being processed. In addition, a diagonal line pattern from the upper right to the lower left in the progress bar indicates that processing for all the pages constituting a corresponding document has succeeded and ended. In addition, a diagonal line pattern from the upper left to the lower right in the progress bar indicates that processing for an image file has failed and ended. A method of displaying states of each processing such as a processing state, a success state, and a failure state in each image file progress bar is not limited to the shaded pattern or the diagonal line pattern, and may be any display in which each is distinguished and other patterns or colors thereof are not a concern.

In FIG. 11B, among three image files, processing for an image file corresponding to a second document succeeds and the other two image files are being processed. That is, in the progress bar 1126, the image file progress bar 1127 and the image file progress bar 1129 indicate a state of being processed, and the image file progress bar 1128 indicates a state in which transfer processing has succeeded.

The image file progress bar 1127 and the image file progress bar 1129 indicate that image file transfer is currently being processed. In this state, a position of the diagonal line pattern changes in accordance with a processing status of pages constituting each document (the number of manuscript pages of each processed document in the present embodiment). A state of the image file progress bar 1127 shows a state in which a two page portion out of three pages constituting a first document has been processed.

The image file progress bar 1128 indicates that processing of image file creation and image file transfer has succeeded and ended. A progress bar portion of a successful image file is indicated in a pattern (a diagonal line pattern from the upper right to the lower left in FIG. 11B) different from an image file being processed.

The image file progress bar 1129, like the image file progress bar 1127, indicates a state of being processed.

FIG. 11C is a diagram which exemplifies a portion of the processing status screen 1110 representing a state of the case in which processing of FIG. 12 has completely ended. In FIG. 11C, the status 1131, the number of successful image file transfers 1132, the number of failed image file transfers 1133, the number of ongoing image file transfers 1134, the total number of files 1135, and a progress bar 1136 are included. The status 1131 to the progress bar 1136 correspond to the status 1111 to the progress bar 1116 of FIG. 11A.

FIG. 11 shows a state in which, among three image files, processing of image files for a second document and a third document has succeeded and processing of an image file for a first document has failed.

An image file progress bar 1137 indicates that there is an error in any processing of image file creation and image file transfer based on a state of an image file progress bar 1127 which was being processed in FIG. 11B, and the processing has failed and ended.

The image file progress bars 1138 and 1139 indicate that image file creation and image file transfer have succeeded and the processing has ended.

Each operation (step) shown in the flowchart of FIG. 12 is realized by the CPU 211 of the MFP 101 executing a control program stored in the HDD 214.

In step S1201, the image processing instruction unit 423 searches for image data of unprocessed page from the table 602 saved in the RAM 213. Specifically, the image processing instruction unit 423 acquires data satisfying a condition in which the page No. 603 is a minimum among data whose status 605 is "unprocessed" and whose QR code information 604 is not "no QR code" from the table 602.

In step S1202, the image processing instruction unit 423 determines whether data acquired in step S1201 exists. If there is data, the procedure proceed to step S1203 because there is an image file in an unprocessed state, and if there is no data, the processing flow ends because there is no image file in an unprocessed state.

In step S1203, the image processing instruction unit 423 changes the status 605 of data of a first page acquired in step S1201 into a "processed" state and updates the RAM 213.

In step S1204, the image processing instruction unit 423 notifies the image processing unit 412 to execute integration processing on image data corresponding to the page No. 603 of data acquired in step S1201. The integration processing of the step S1204 is performed by one page of a manuscript. Specifically, when there is an image file which is already being integrated, the image processing unit 412 notified of the integration processing of image data integrates designated image data at the end of the image file. In addition, when there is no image file which is being integrated, a new image file is created using the designated image data.

In step S1205, the image processing instruction unit 423 determines whether the integration processing of step S1204 normally ends. If the integration processing normally ends, the procedure proceeds to step S1206, and, if the integration processing fails, the procedure proceeds to step S1213.

In step S1206, the image processing instruction unit 423 calculates an area corresponding to a processed page portion by multiplying the number of pixels for each scanned page calculated in step S1002 by a page number which is currently being processed. Then, the display unit 422 is requested to draw an area portion calculated by setting the progress bar start position 606 of the image file saved in the RAM 213 in step S1007 as a start point in a pattern of being processed.

In step S1207, the image processing instruction unit 423 sets the status 605 of a page integrated in step S1204 to a "processed" state and updates the RAM 213. In addition, in the case of a first page, the status 605 is updated with a state for a value obtained by adding one to the number of on-going image file transfers 1124.

In step S1208, the image processing instruction unit 423 determines whether there is a next page to be integrated. Specifically, the image processing instruction unit 423 acquires information corresponding to a next page No. 603 and determines whether a value of the QR code information 604 thereof is "no QR code". If a value of the QR code information 604 is "no QR code", the procedure returns to step S1204 to perform integration processing on a next page. On the other hand, if a value of the QR code information 604 is not "no QR code", the procedure proceeds to step S1209.

In step S1209, the image processing instruction unit 423 determines a transfer destination of the generated image file. Specifically, a transfer destination of the generated image file is determined by combining transfer destination information acquired by the transfer information acquisition unit 425 and transfer destination path and file name information of the QR code information 604 acquired from the table 602 in step S1201.

In step S1210, the transfer unit 424 performs a transfer of an image file. Specifically, the image processing instruction unit 423 requests the transfer unit 424 to perform a transfer of an image file according to the transfer destination information determined in step S1209. And the transfer unit 424 transfers an image file to the file server 102 according to the transfer destination information.

In step S1211, the image processing instruction unit 423 determines whether the transfer of an image file transmitted in step S1210 normally ends. If the transfer normally ends, the procedure proceeds to step S1212, and, if the transfer fails, the procedure proceeds to step S1213.

In step S1212, the image processing instruction unit 423 performs updating of a progress bar. In step S1212, since the transfer of an image file has normally ended, the image processing instruction unit 423 requests the display unit 422 to change and draw a progress status in a pattern of a success state like the image file progress bar 1128 of a progress bar. In addition, at this time, the image processing instruction unit 423 instructs a deletion of the generated image file to the image processing unit 412.

In step S1213, the image processing instruction unit 423 performs updating of a progress bar. In step S1213, since there is an error has occurred in the integration of image data or the transfer of an image file, the image processing instruction unit 423 requests the display unit 422 to change and draw a progress status in a pattern of a failure state like the image file progress bar 1137 of a progress bar. In addition, at this time, the image processing instruction unit 423 instructs a deletion of the generated image file to the image processing unit 412.

In step S1214, the transfer unit 424 saves a result of the processing in the transfer history holding unit 427. A result of the processing includes, in addition to the information on transfer destination determined in step S1209, information on whether the integration of manuscript performed in step S1205 has succeeded and information on whether the transfer of an image file according to transfer information performed in step S1211 has succeeded, and includes a failure reason and the like if the integration has failed.

As described above, according to the present embodiment, it is possible to ascertain how much processing has been made in all of a plurality of documents by displaying a progress status of processing for an individual document within one progress bar even on a screen with a small display area. That is, it is possible to ascertain a processing status of all of a plurality of documents to be processed and a processing status of an individual document being processed in parallel.

Second Embodiment

Next, a second embodiment will be described. A difference from the first embodiment is that an image size (file size) is used instead of the number of pages of a scanned image in configuration calculation of a progress bar and size calculation of a progress bar in progress bar updating processing. The difference from the first embodiment will be described using FIGS. 13 and 14.

Figure 13:
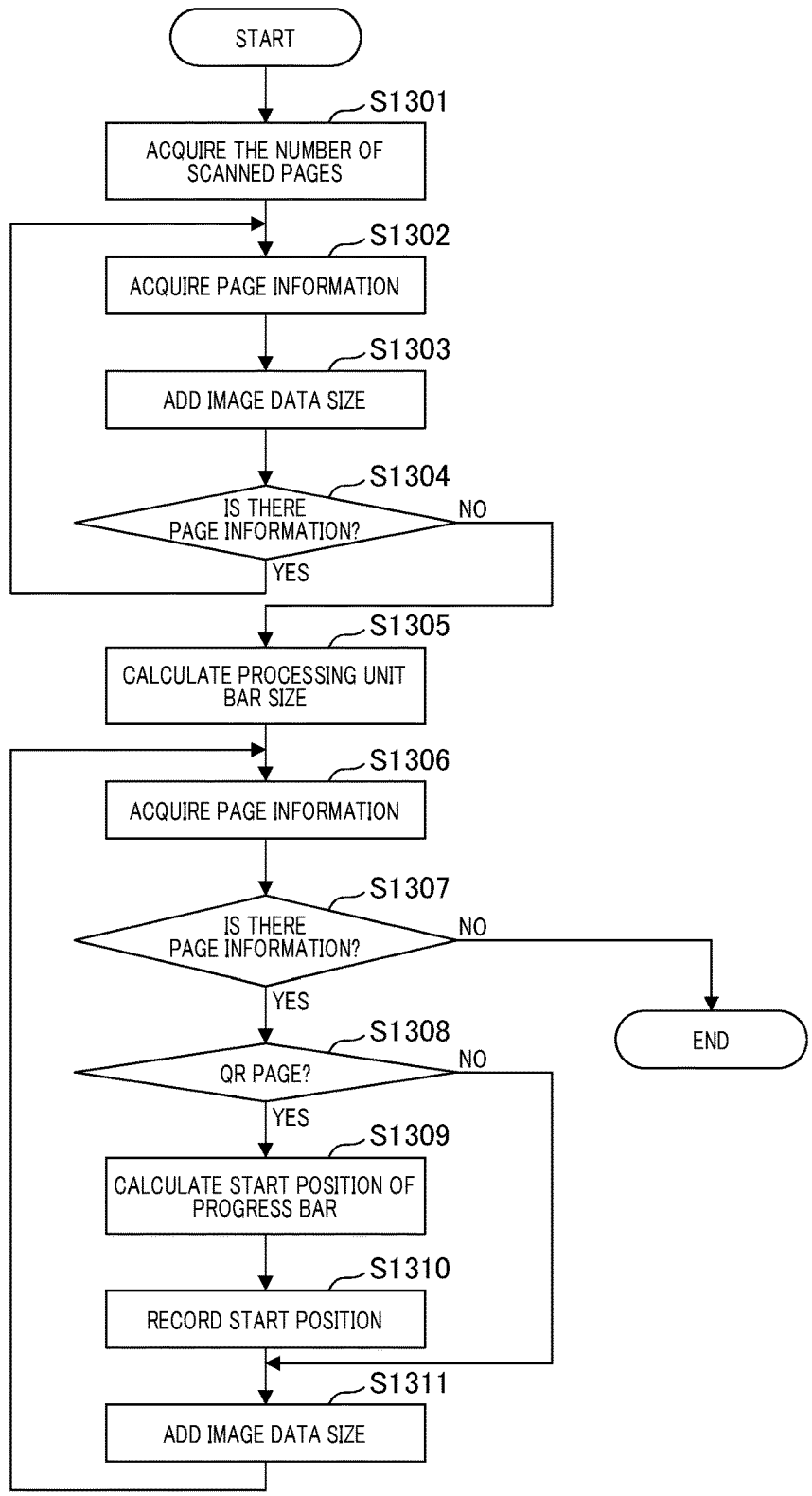
FIG. 13 is a flowchart which shows the operation of the MFP 101.

FIG. 13 is a flowchart in which calculation processing at the time of configuring a progress bar is performed, and is a substitute for a processing flow of FIG. 10 used for the progress bar configuration calculation performed in step S903 of FIG. 9. The present processing is processing executed by the image processing instruction unit 423. Step S1301 has the same processing as the step S1001, steps S1306 to S1308 have the same processing as the steps S1003 to S1005, and step S1310 has the same processing as the step S1007, and thus description thereof will be omitted.

In step S1302, the image processing instruction unit 423 acquires data in forms of the table 602 saved in the RAM 213 one piece by one piece in an order in which the page No. 603 is small.

In step S1303, the image processing instruction unit 423 acquires an image data size of image data acquired in step S1302, and adds the size to a total value of data size. Specifically, the image processing instruction unit 423 requests the image processing unit 412 to calculate an image data size of image data corresponding to a page acquired in step S1302, and the image processing unit 412 calculates an image data size. The image processing instruction unit 423 acquires the calculated image data size and adds the acquired value to the total value saved in the RAM 213. If the total value is not saved in the RAM, the image processing instruction unit 423 registers the acquired value as a new total value. An image data size of each page acquired by the image processing unit 412 may be added to the data in forms of the table 602 and may be saved in the RAM 213 in correlation with the data of the table 602.

In step S1304, the image processing instruction unit 423 determines whether there is data of a page with a page No. 603 which is large next to the data acquired in step S1302. If the data exists, the procedure returns to step S1302, and, if the data does not exist, the procedure proceeds to step S1305.

In step S1305, the image processing instruction unit 423 calculates the number of width pixels of a progress bar for each predetermined unit data size. Specifically, first, the number of divisions of a progress bar is calculated by dividing the total value of image data size saved in the RAM 213 which is added in step S1303 by a predetermined unit data size. Next, the number of width pixels for each unit size is calculated by dividing the number of width pixels of a progress bar calculated in step S902 by the previously calculated number of divisions+1. In the present embodiment, calculation is performed by setting this predetermined unit data size as 100 KB, but this predetermined unit data size may be changed in a system.

In step S1309, the image processing instruction unit 423 calculates the start position of a progress bar. The image processing instruction unit 423 sets a position at a left end of the progress bar as the start position of an image file progress bar corresponding to an image file including a first page in a first S1309. In a second and subsequent S1309 (that is, if a first page of a next document including a QR code is detected and the procedure proceeds to S1309), the start position (the separation position of an image file progress bar) of a next image file progress bar is set. At this time, the image processing instruction unit 423 calculates the separation position of a progress bar by dividing a total size of image data calculated in step S1311 for documents so far by a unit data size and multiplying this calculated value by the number of width pixels for each unit size calculated in step S1305.

In step S1311, the image processing instruction unit 423 acquires an image data size of image data acquired in step S1306 and adds the acquired value to a total value of a processed document saved in the RAM 213. It is possible to calculate a file size corresponding to each image file (document) by performing the addition. This value is different from a value saved by performing addition in step S1303.

Figure 14:
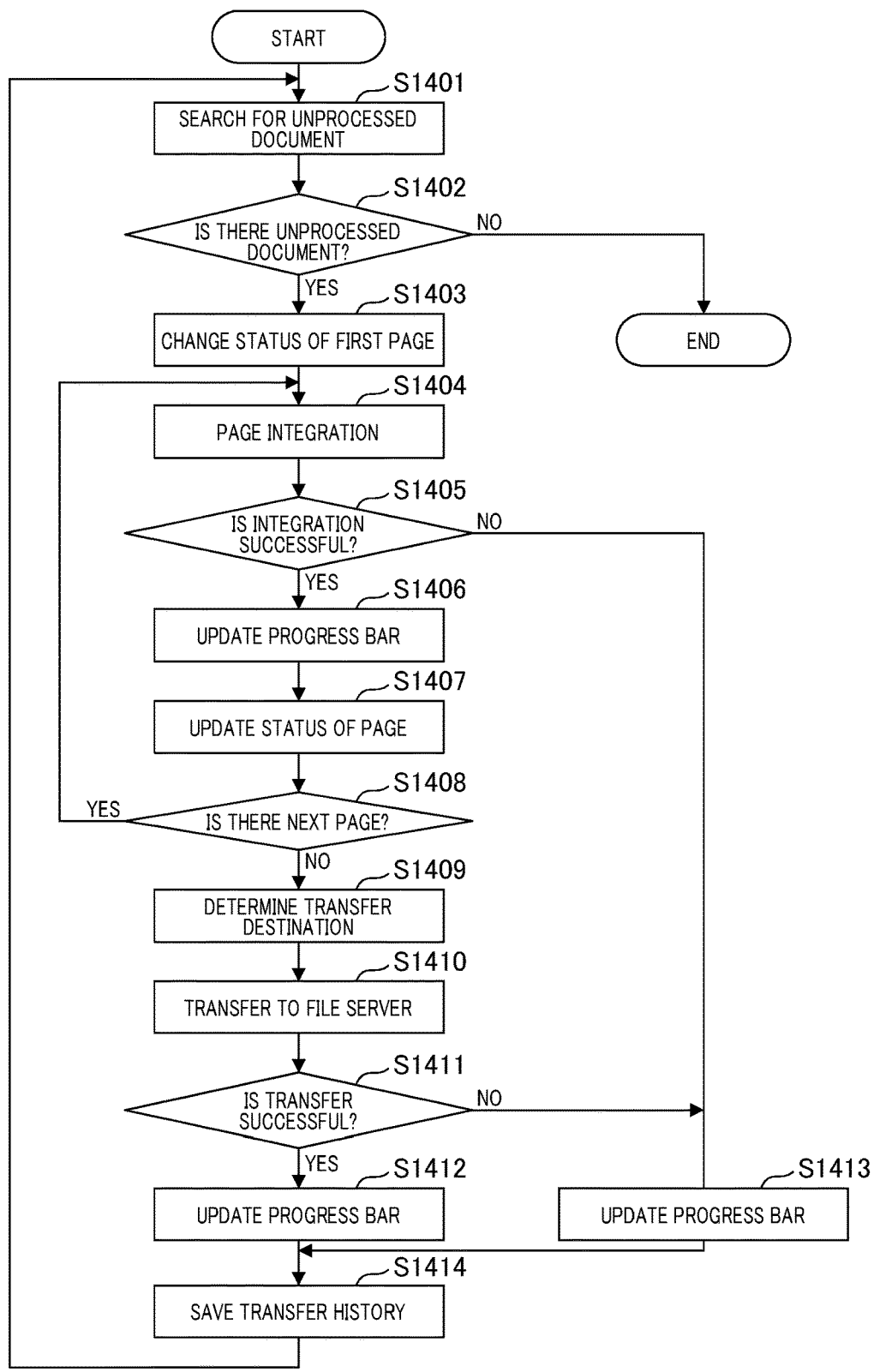
FIG. 14 is a flowchart which shows the operation of the MFP 101.

FIG. 14 is a flowchart which describes the operation of document generation processing (step S705 of FIG. 7) in the present embodiment in details, and is a substitute for the processing flow of FIG. 12. The present processing is processing executed by the image processing instruction unit 423 after the image processing instruction unit 423 performs a display of the processing status screen 1110 through the display unit 422. Since steps S1401 to S1405 have the same processing as the steps S1201 to S1205, and steps S1407 to S1414 have the same processing as the steps S1207 to S1214, description thereof will be omitted.

In step S1406, the image processing instruction unit 423 updates the display of the progress bar. At this time, updating of the display of the progress bar is performed on the basis of an image data size. Specifically, the image processing instruction unit 423 first requests the image processing unit 412 to calculate a data size of image data integrated in S1404, and acquires the value. Next, the image processing instruction unit 423 calculates the number of incremented pixels of the progress bar by dividing the acquired value by a unit data size used in step S1305 and multiplying this calculated value by the number of width pixels for each unit size calculated in step S1305. Then, the image processing instruction unit 423 requests the display unit 422 to draw an image file progress bar for an area obtained by adding the number of incremented pixels calculated based on a point drawn in processing of previous image data in a pattern of being processed, and the display unit 422 updates the display of the progress bar.

As described above, according to the present embodiment, it is possible to ascertain a status of a plurality of parallel processings without impairing a list of processing statuses by displaying progress statuses of all and individual processing in one progress bar even on a screen with a small display area.

Third Embodiment

A difference between a third embodiment and the first and the second embodiments is that a function of checking the details in a processing result of a failed image file by selecting a display area of the progress bar 1116 is further included. This function will be described using FIGS. 15 and 16. The other configurations are the same as the first and the second embodiments, and thus description thereof will be omitted.

Figure 15:
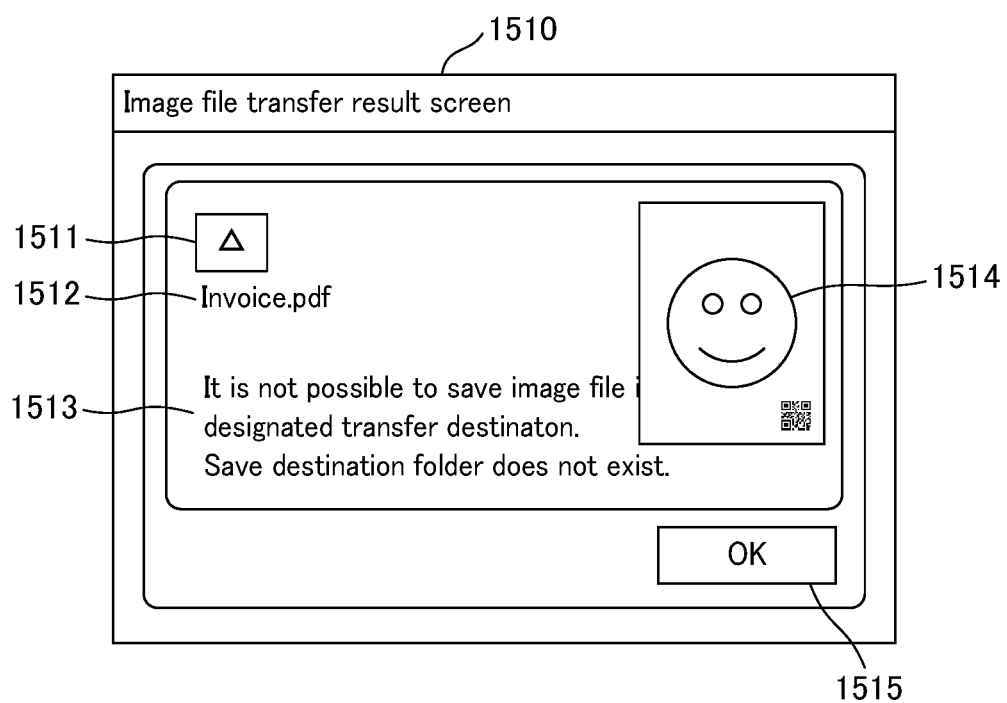
FIG. 15 is a diagram which shows the operation screen of the MFP 101.

FIG. 15 is a diagram which shows an example of an image file transfer result screen 1510 displayed for checking a result of processing an image file. FIG. 16 is a flowchart which describes operations of the MFP 101 when a progress bar of the processing status screen 1110 of FIG. 11A is pressed. The image file transfer result screen 1510 is displayed by processing of FIG. 16.

Each operation (step) shown in the flowchart of FIG. 16 is realized by the CPU 211 of the MFP 101 executing a control program stored in the HDD 214. In the present processing flow, the display unit 422 which detects that a user has pressed an arbitrary place on the processing status screen 110 of FIG. 11A performs processing.

In step S1601, the display unit 422 acquires coordinate information on a position on which a user has pressed.

In step S1602, the display unit 422 determines whether the coordinate information acquired in step S1601 is within a drawing area of a progress bar. If the coordinate information is within the drawing area, the procedure proceeds to step S1603 and, if not within the drawing area, the present processing flow ends.

In step S1603, the display unit 422 passes the coordinate information acquired in step S1601 to the image processing instruction unit 423 and requests the image processing instruction unit 423 to specify an image file indicated by a coordinate designated by a user. The image processing instruction unit 423 returns transfer destination information of image file information in which the passed coordinate information is larger than coordinate information on a start position held in the RAM 213 and has a small difference to the display unit 422.

In step S1604, the display unit 422 passes transfer destination information acquired in step S1604 to the transfer history holding unit 427, and requests the transfer history holding unit 427 to acquire transfer history information. The transfer history holding unit 427 returns transfer history information having corresponding transfer destination information among the transfer history information saved in step S1214 to the display unit 422. If the transfer history information is not registered, the transfer history holding unit 427 returns that effect to the display unit 422.

In step S1605, the display unit 422 determines whether the transfer history information acquired in step S1604 has "failed." If the transfer has "failed," the procedure proceeds to step S1606, and, if the transfer has "succeeded" or there is no transfer history information, the present processing flow ends. In the present embodiment, control is performed such that the procedure proceeds to step S1606 only in the case of failure, but control may be performed such that the procedure proceeds to step S1606 when the transfer has succeeded or even when there is no transfer history information, and a result of the processing is displayed.

In step S1606, the image file transfer result screen 1510 is displayed on the basis of the transfer history information acquired by the display unit 422.

The image file transfer result screen 1510 includes an icon 1511, transfer destination information 1512, a failure reason 1513, a thumbnail 1514, and an "OK" key 1515. The icon 1511 is an icon indicating a success or failure state of transfer history information. The transfer destination information 1512 displays image file name and path information which is transfer destination information of the transfer history information. The failure reason 1513 displays a failure reason of the transfer history information. The thumbnail 1514 displays image data at the head of an image file indicated by the transfer history information. If the "OK" key 1515 is pressed, the image file transfer result screen 1510 which is being displayed is closed.

As described above, in the present embodiment, description has been performed using drawing numbers of the first embodiment, but it is possible to replace those in the second embodiment with the drawing numbers corresponding to the first embodiment.

As described above, according to the present embodiment, it is possible to display the details of a processing result by selecting a portion of a progress bar and to provide an information processing apparatus with an improved recognition by a user.

Fourth Embodiment

The present embodiment is made by adding a function to the third embodiment, and a difference from the third embodiment is that a function of specifying an image file when a use presses on a progress bar is included. This function will be described using FIGS. 17A, 17B and 18. The other configurations are the same as the third embodiment, and thus description thereof will be omitted.

Figure 17A:
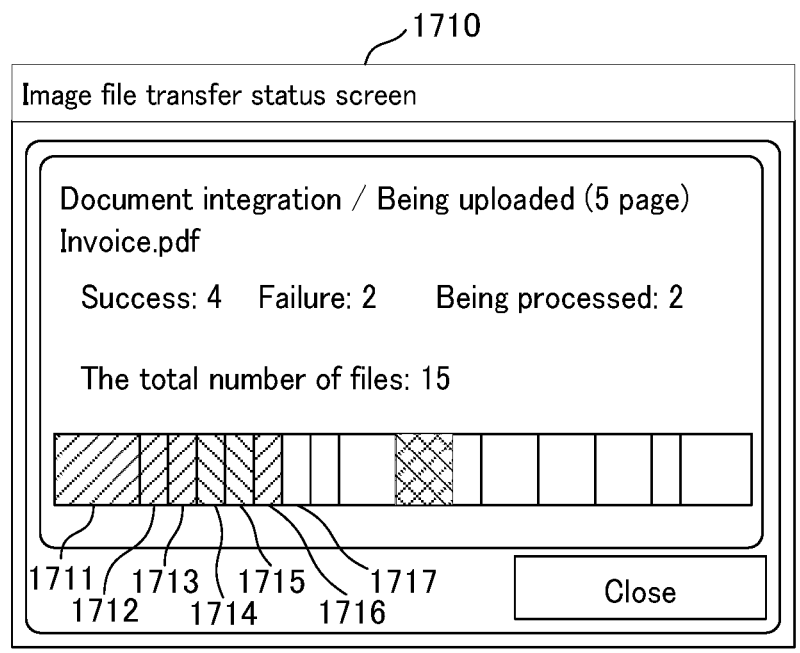
FIGS. 17A and 17B are diagrams which show the operation screen of the MFP 101.
Figure 17B:
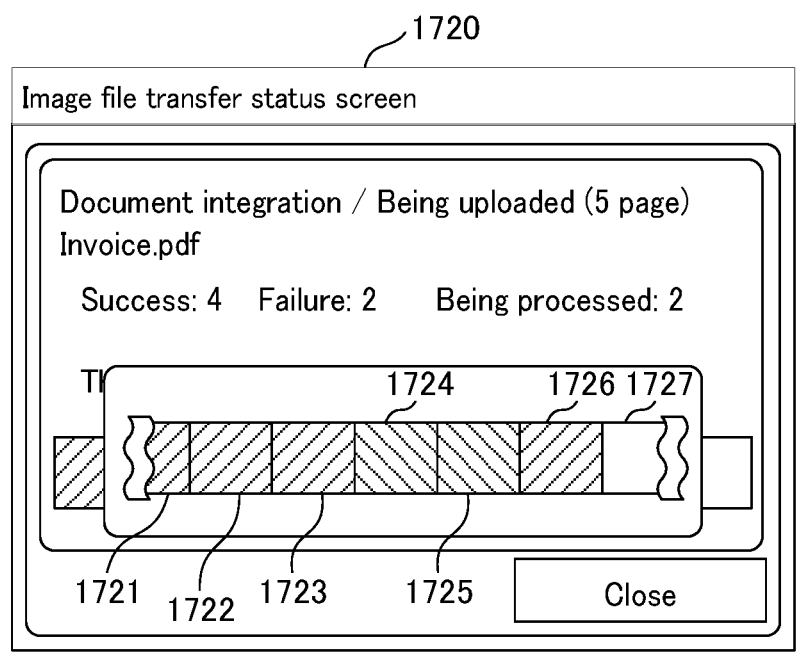

FIGS. 17A and 17B are diagrams which show examples of a display screen during transfer processing of an image file. During the transfer of an image file, the processing status screen 1710 of FIG. 17A is normally displayed. A basic configuration of FIG. 17A is the same as that of FIG. 11A. However, the number of image files to be processed is 15, and a progress bar is divided into 15 in FIG. 17A. As a result, an image file progress bar area for each image file becomes narrower and it is more difficult for a user to recognize a processing state for each image file. Image file progress bars 1711, 1712, 1713, and 1716 show that processing of an image file has succeeded. On the other hand, image file progress bars 1714 and 1715 show that processing of an image file has failed.

Here, in the present embodiment, if a user presses a portion of the progress bar, as shown in FIG. 17B, a progress bar in the vicinity of a pressed area is displayed to be enlarged, and thereby user's recognition is improved.

Figure 18:
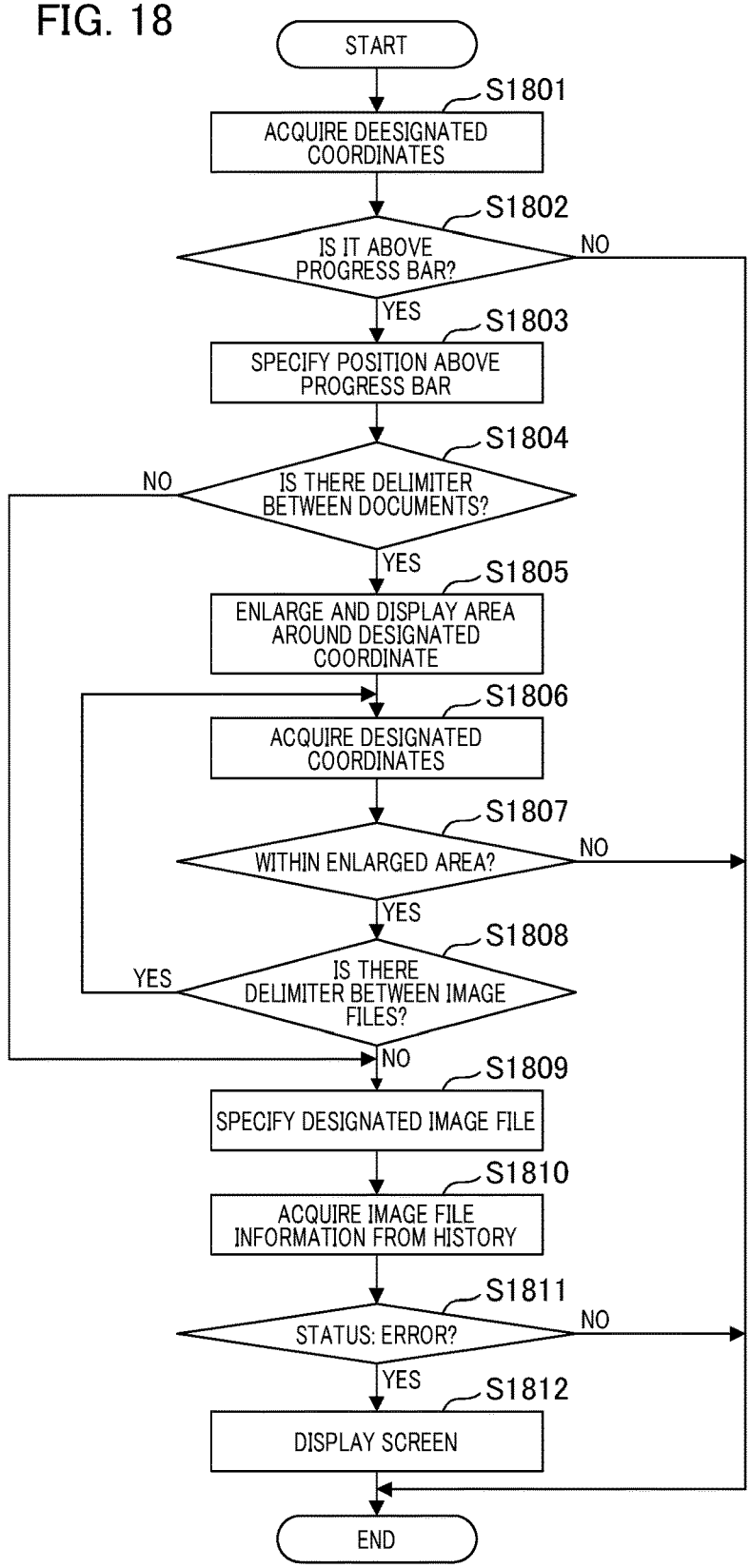
FIG. 18 is a flowchart which shows the operation of the MFP 101.

FIG. 18 is a flowchart which describes an operation of the MFP 101 when an arbitrary place on the processing status screen 1110 is pressed, and is a substitute for FIG. 16 of the third embodiment. The present processing is processing executed by the display unit 422. Since steps S1801 and S1802 are the same processing as the steps S1601 and S1602, and steps S1809 to S1812 are the same processing as the steps S1603 to 1606, description thereof will be omitted.

In step S1803, the display unit 422 passes coordinate information acquired in step S1801 to the image processing instruction unit 423, and requests the image processing instruction unit 423 to determine whether coordinates designated by a user is in the vicinity of a boundary between image files on a progress bar. The image processing instruction unit 423 determines whether the coordinate information is within a certain range from a start position held in the RAM 213 and saved in step S1007. As a result of the determination, the image processing instruction unit 423 returns information indicating that the coordinates is in the vicinity of a boundary if the information is within a certain range, or information indicating that the coordinates is not in the vicinity of a boundary if out of a certain range to the display unit 422. In the present embodiment, determination is performed by setting a range value used to determine this range as 50 pixels, but this value itself may be made to change in a system.

In step S1804, the display unit 422 determines the information on whether the coordinates is in the vicinity of a boundary, which is acquired in step S1803. If the coordinates is in the vicinity of a boundary, the procedure proceeds to step S1805, and, if the coordinates is not in the vicinity of a boundary, the procedure proceeds to step S1809.

In step S1805, the display unit 422 divides the number of width pixels of an entire progress bar 1116 by four, enlarges and displays a progress bar with a width of a value corresponding to a result of the division around the coordinates acquired in step S1801, that is, around the coordinate information.

FIG. 17B is a diagram which shows an example of the processing status screen 1720 when the enlarged display is performed in step S1805. Description is performed by assuming that a user has pressed in the vicinity of a boundary between the image file progress bar 1714 and the image file progress bar 1715 in FIG. 17A. The image file progress bars 1711 to 1717 represent states of image files the same as image files 1721 to 1727, respectively. This area is displayed to overlap an entire progress bar. As an enlarged display method, this area is displayed to overlap the entire progress bar in the present embodiment, but other methods or a display place may be used as the enlarged display method.

In step S1806, the display unit 422 acquires coordinates at which a user has pressed an arbitrary place of the processing status screen 1720 after the enlarged display displayed in S1805.

In step S1807, the display unit 422 determines whether coordinate information acquired in step S1806 is within an enlarged display area displayed in step S1805. If the coordinate information is within an enlarged display area, the procedure proceeds to step S1808, and, if the coordinate information is out of the enlarged display area, the procedure proceeds to step S1813.

In step S1808, the display unit 422 determines whether the coordinate information acquired in step S1806 is in the vicinity of a boundary of an image file in the enlarged display area. If the coordinate information is in the vicinity of the boundary, the procedure returns to step S1806 and waits an operation of a user again. If the coordinate information is not in the vicinity of the boundary, the procedure proceeds to step S1809.

As described above, according to the present embodiments, it is possible to enlarge and display a portion of the progress bar, and to provide an information processing apparatus with further improved recognition of a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-023482, filed Feb. 10, 2017, which is hereby incorporated by reference wherein in its entirety.

What is claimed is:

1. An information processing apparatus which executes individual processes for a plurality of documents, the apparatus comprising:

a processor; and a memory that stores a computer executable instructions, wherein the processor executes the computer executable instructions to perform;

dividing an area, that indicates progress status about all of the individual processes to be executed for the plurality of documents into individual areas, wherein the information processing apparatus executes at least two of the individual processes to be executed for the plurality of documents in parallel; and displaying, in each of the divided individual areas, individual process statuses about each of the individual processes to be executed for the plurality of documents in parallel.

2. The information processing apparatus according to claim 1,
wherein the processor divides the area into the individual areas in accordance with the number of pages of each of the plurality of documents.

3. The information processing apparatus according to claim 1,
wherein the processor divides the area into the individual areas in accordance with a file size of each of the plurality of documents.

4. The information processing apparatus according to claim 1,
wherein the processor further displays, in each of the divided individual areas, any one of states such as unprocessed, in progress, success, and failure in accordance with individual progress status about an individual process to be executed for a document corresponding to each of the individual areas.

5. The information processing apparatus according to claim 1,
wherein, if one of the individual areas is selected by a user, the processor further displays details of the individual progress status about an individual process to be executed for a document corresponding to the selected individual area.

6. The information processing apparatus according to claim 5,
wherein, if an individual area corresponding to a document for which the individual process has failed is selected by a user, the processor further displays details including a reason for the failure.

7. The information processing apparatus according to claim 1,
wherein, if a vicinity of the boundary of the individual area is selected by a user, the processor further displays an area around the selected position in a larger size.

8. The information processing apparatus according to claim 1,
wherein the processor displays, in each of the divided individual area, a progress bar which indicates the individual progress status about each of the individual processes to be executed for the plurality of documents in parallel.

9. The information processing apparatus according to claim 1, wherein the processor executes the computer executable instructions to further perform:
controlling to collectively scan the plurality of documents to generate image data of each page included in the plurality of documents;
acquiring a separation position for each document by analyzing the image data of each page;
integrating the image data of each page into an image file for each document on the basis of the acquired separation position; and
transferring the integrated image file for each document to an external device,
wherein the processor displays, in the divided individual areas, the individual progress statuses about at least one of the integrating and transferring for a corresponding document.

10. A method of controlling an information processing apparatus which executes individual processes for a plurality of documents, the method comprising:
calculating display positions of a plurality of individual area, wherein at least two of the individual processes are executed for the plurality of documents in parallel; and
displaying, in each of the divided individual areas, individual progress statuses about each of the individual processes to be executed for the plurality of documents in parallel.

11. The control method according to claim 10,
wherein the display positions of the plurality of individual areas are calculated on the basis of the total number of pages of all of the plurality of documents and the number of pages of each of the plurality of documents.

12. The control method according to claim 10,
wherein the display positions of the plurality of individual areas are calculated on the basis of a sum of data sizes of all of the plurality of documents and a data size of each of the plurality of documents.

13. The control method according to claim 10,
wherein the displaying further displays, in each of the divided individual areas, any one of states such as unprocessed, in process, success, and failure in accordance with individual progress status about an individual process to be executed for a document corresponding to each of the individual areas.

14. The control method according to claim 10,
wherein, if one of the individual areas is selected by a user, the displaying further displays the details of the individual progress status about an individual process to be executed for a document corresponding to the selected individual area.

15. The control method according to claim 14,
wherein, if an individual area corresponding to a document on which the individual process has failed is selected by a user, the displaying further displays the details including a reason for the failure.

16. The control method according to claim 10,
wherein, if a position in the vicinity of a boundary of the individual area is selected by a user, the displaying further enlarges and displays an area around the selected position.

17. The control method according to claim 10,
wherein the individual area displays a progress bar indicating the individual progress status about each of the individual processes to be executed for the plurality of documents in parallel.

18. The control method according to claim 10, further comprising:
controlling to collectively scan the plurality of documents to generate image data of each page included in the plurality of documents;
acquiring a separation position for each document by analyzing the image data of each page;
integrating the image data of each page into an image file for each document on the basis of the acquired separation position; and
transferring the integrated image file for each document to an external device,
wherein the divided individual areas displays the individual progress statuses about at least one of the integrating and the transferring for a corresponding document.

19. A non-transitory storage medium storing a computer program that causes a computer to perform:

dividing an area, that indicates a progress status about all of individual processes to be executed for a plurality of documents, into individual areas, wherein at least two of the individual processes to be executed for the plurality of documents are executed in parallel; and displaying, in each of the divided individual areas, individual progress statuses about each of the individual processes to be executed for the plurality of documents in parallel.

* * * * *